US012799350B2

(12) United States Patent
Feola et al.

(10) Patent No.: US 12,799,350 B2
(45) Date of Patent: Nov. 17, 2026

(54) COATING COMPOSITION

(71) Applicant: Allnex Austria GmbH, Werndorf (AT)

(72) Inventors: Roland Feola, Graz (AT); Oliver Etz, Mainz (DE); Boris Maroh, Ljubljana (SI)

(73) Assignee: ALLNEX AUSTRIA GMBH, Werndorf (AT)

( * ) Notice: Subject to any disclaimer, the term of this patent is extended or adjusted under 35 U.S.C. 154(b) by 276 days.

(21) Appl. No.: 18/707,689

(22) PCT Filed: Dec. 15, 2022

(86) PCT No.: PCT/EP2022/086166
§ 371 (c)(1),
(2) Date: May 6, 2024

(87) PCT Pub. No.: WO2023/111186
PCT Pub. Date: Jun. 22, 2023

(65) Prior Publication Data
US 2026/0152663 A1 Jun. 4, 2026

(30) Foreign Application Priority Data
Dec. 16, 2021 (EP) .................................... 21215200

(51) Int. Cl.
*C09D 167/07* (2006.01)
*C08G 63/553* (2006.01)
*C09D 125/14* (2006.01)

(52) U.S. Cl.
CPC ......... *C09D 167/07* (2013.01); *C08G 63/553* (2013.01); *C09D 125/14* (2013.01)

(58) Field of Classification Search
None
See application file for complete search history.

(56) References Cited

U.S. PATENT DOCUMENTS 6,306,934 B1 10/2001 Bode et al.
8,092,876 B2 1/2012 O'Brien et al.
9,011,999 B2 4/2015 Cavallin et al.
2004/0186226 A1* 9/2004 Glockner .............. C08F 283/01 524/600
2004/0186227 A1* 9/2004 Spilman ................. C08J 7/0427 524/601
2011/0171481 A1 7/2011 Kainz et al.
2012/0058354 A1* 3/2012 Hayes .................. C09D 175/06 72/46
2012/0145721 A1 6/2012 Cavallin et al.
2012/0301647 A1 11/2012 Moussa et al.
2014/0076768 A1 3/2014 Skillman et al.
2014/0319012 A1 10/2014 Cavallin et al.
2016/0115274 A1* 4/2016 Kuo .................... C09D 167/02 524/379
2017/0081549 A1 3/2017 Moussa et al.
2017/0313473 A1 11/2017 Cavallin et al.
2017/0320629 A1 11/2017 Han et al.
2020/0010692 A1 1/2020 Riazzi et al.
2020/0207516 A1 7/2020 Seneker et al.
2020/0255186 A1 8/2020 Seneker et al.
2020/0399022 A1 12/2020 Cavallin et al.
2023/0036598 A1 2/2023 Zhang et al.

FOREIGN PATENT DOCUMENTS

EP 3 208 289 8/2017
JP 2004-292665 10/2004
WO 99/51696 10/1999
WO 2012/162301 11/2012
WO 2013/123314 8/2013
WO 2016/073711 5/2016
WO 2018/118802 6/2018
WO 2019/045944 3/2019
WO 2021/133873 7/2021

OTHER PUBLICATIONS

International Search Report (ISR) issued Mar. 22, 2023 in International (PCT) Application No. PCT/EP2022/086166.
Polymeric Materials Science and Engineering; vol. 65, pp. 277-278, Fall Meeting 1991.

* cited by examiner

*Primary Examiner* — John Vincent Lawler
(74) *Attorney, Agent, or Firm* — Wenderoth, Lind & Ponack, L.L.P.

(57) ABSTRACT

The present invention relates to an aqueous coating composition comprising: —one or more anionic salt group(s) comprising unsaturated polyester(s); or—an anionic salt groups comprising blend of one or more unsaturated polyester(s) and one or more saturated polyester(s); or—an anionic salt groups comprising blend of one or more unsaturated polyester(s) and one or more acid functional vinyl copolymers(s), wherein said blend is a physical blend and/or a reaction product, preferably a reaction product; or—an anionic salt groups comprising blend of one or more unsaturated polyester(s), one or more saturated polyester(s), and one or more acid functional vinyl copolymers(s), wherein said blend is a physical blend and/or a reaction product, preferably a reaction product. The present invention also relates to the use of said aqueous coating composition for coating a metal substrate, to a method for producing a coated metal substrate and to a method for producing coated can bodies and can ends.

15 Claims, No Drawings

COATING COMPOSITION

FIELD OF THE INVENTION

The present invention is related to a waterborne coating composition comprising:

- a salt comprising unsaturated polyester, or
- a salt comprising blend of an unsaturated polyester and a saturated polyester, or
- a salt comprising blend of an unsaturated polyester, optionally a saturated polyester, and a copolymer of polymerized alpha, beta ethylenically unsaturated monomers.

The present invention is also related to the unsaturated polyesters and the copolymer as such, to the method for producing a coated substrate, to the coated substrate as such, and to the use of the coating composition.

BACKGROUND ART

Besides for aesthetic reasons, coatings intend to protect substrates against the destructive effects intentionally or accidentally affecting them. The coating should meet a substantial range of specific properties related to resistance to heat, ultraviolet irradiation, chemicals and mechanical forces, among others.

The application of coatings to metal substrates, to retard or inhibit corrosion, is well established.

Coatings in general are applied to a wide variety of substrates either as a liquid to a substrate using any suitable procedure such as spray coating, roll coating, curtain coating, immersion coating, dip coating, and the like, or as a solid using fluidized bed or electrostatic deposition such as corona or tribo guns. For the particular case where the coating is used to coat metal sheets or coils, the coating can be applied by roll coating.

A typical application of coatings relates to the interior and optionally the exterior of (light) metal packaging, more particularly metal can bodies and can ends, in order to prevent the contents of said cans from contacting the metal. Contact between the metal and the packaged product can lead to corrosion of the metal, which can contaminate the packaged product.

Coating compositions for the inside of beer, beverage and food cans must be approved for direct food contact. The fundamental function of the inside coatings on can bodies and can ends (see for example "Polymeric Materials Science and Engineering", Volume 65, Fall Meeting 1991, New York, pages 277-278) is to protect the packed product to maintain its nutritional value, texture, colour and flavour when purchased and used by the consumer. To meet these requirements, the organic film must be free of any material which might extract into the packed product and must maintain its integrity over the product recommended shelf life.

Common state-of-the-art systems for interior can coatings for food and beverage are mainly combinations of phenol and/or melamine/benzoguanamine (formaldehyde based) crosslinkers with Bisphenol A based epoxy resins, or alternatively with polyesters.

Many of the coating compositions for food and beverage containers are based on polyether resins that are in turn based on polyglycidyl ethers of bisphenol A. Bisphenol A in container coatings, either as bisphenol A itself or derivatives thereof (such as diglycidyl ethers of bisphenol A, epoxy novolak resins and polyols prepared with bisphenol A and bisphenol F) are problematic. Traces of bisphenol A diglycidyl ether from epoxy resin coating materials leach out of the interior coatings of preserve cans and are absorbed into the human organism when eating the food taken out of these cans. In oil-containing fish cans, indeed, inadmissibly high concentrations of bisphenol A diglycidyl ether, which leach from the interior coating, have been measured. Bisphenol A diglycidyl ether is now suspected on intake into the human organism of having brought about carcinogenic and estrogenic effects. Consequently, Bisphenol-A Non-Intent (throughout the present description also referred to as "BPA-NI") is currently a strong market need, mainly in the United States and in Europe.

Over the last years, alternative BPA-NI systems like high molecular polyesters or acrylic resins, in combination with phenolic-/amino-/isocyanate-crosslinkers, have appeared in the can coating market from several suppliers. Many of those are solvent borne systems, and are not isocyanate- and formaldehyde-free.

Ideally, any components that are suspect according to the Health and Safety Executive (HSE) or the Food and Drug Administration (FDA), such as bisphenol A, bisphenol F, formaldehyde and isocyanates among others, should be avoided in the future can coatings with (or intended for) food contact.

There is also an increasing desire in the market for aqueous can-coating systems, especially for beer and beverage can applications, optionally comprising a reduced amount of co-solvents (if any), of no ecological and/or health concern.

Aqueous coatings for the interior surface of can bodies and can ends already are disclosed in a vast number of prior art documents.

WO 2018118802 A1 discloses a stable aqueous dispersion comprising, on solid content, between 10 and less than 50% by weight of a hydrophobic aromatic saturated polyester having a number average molecular weight of greater than 7,000 Daltons and an acid number comprised between 1 and 5 mg KOH/g; and between 50 and 80% by weight of a water-dispersible aromatic polyester dispersant, being the reaction product of an acid group comprising polyester with an acid number comprised between 5 and 200 mg KOH/g and a neutralizing agent. The water-dispersible aromatic polyester may comprise end salt groups or salt groups attached to the polyester via a Diels-Alder or Ene reaction of the unsaturated compound in the unsaturated polyester precursor with a compound comprising one or more double or triple bonds.

WO2013123314 A1 discloses an aqueous dispersion of a water-dispersible polymer, wherein the polymer includes a backbone having at least one heteroatom including any combination of condensation and/or step growth linkages, including, for example, amide, carbonate ester, ester, ether, imide, urea, urethane, or combinations thereof; and a side group that includes at least one salt group, wherein the side group comprises the reaction product of an unsaturated compound having at least one salt or salt-forming group that is attached to another portion of the polymer via a Diels-Alder or Ene reaction of the unsaturated compound with one or more double or triple bonds.

US 2011171481 A1 discloses an aqueous dispersion comprising the melt blending product of:

(a) from 50 to 99 percent by weight of one or more first thermosetting polyesters, based on the total solid content of the dispersion, wherein said one or more first polyesters have an acid number in the range of from less than 15 mg KOH/g, based on the total solid content of the one or more first polyesters;

(b) from 1 to 50 percent by weight of one or more stabilizing agents comprising at least one second polyester, based on the total solid content of the dispersion, wherein said second polyester has a carboxylic acid group and an acid number equal to or greater than 15 mg KOH/g, based on the total solid content of the one or more second polyesters;

(c) one or more neutralizing agents; and (d) from 15 to 90 percent by weight of water, based on the total weight of the dispersion;

wherein said dispersion has a solid content of 10 to 85 percent.

WO 2021133873 A1 discloses a coating composition comprising:

(a) between 30 and 90% by weight of a first polyester material having an acid number comprised between 0 and 50 mg KOH/g and a glass transition temperature comprised between −20 and 50° C.;

(b) between 0.05 and 10% by weight of a second polyester material different from the first polyester material, wherein the second polyester material has an acid number comprised between 15 and 25 mg KOH/g and comprises the reaction product of a reaction mixture comprising a polyacid; a polyol; and a phosphorous acid; and (c) between 5 and 50% by weight of an acid-functional acrylic material having an acid number comprised between 10 and 500 mg KOH/g; based on the total solid weight of the coating composition.

U.S. Pat. No. 9,011,999 B2 discloses a coating composition, which may be water based and may be self-crosslinkable, including an unsaturated polymer, such as, for example, an unsaturated polyester polymer; an ether component including one or more ether groups; and an optional liquid carrier. In preferred embodiments, At least 5% of the unsaturated polymer, based on the total weight of non-volatile material in the coating composition has an iodine value of at least 10.

WO 2019045944 A1 discloses a coating composition comprising a polyester material prepared from condensation of polyacids and polyols wherein said polyacids including unsaturated diacids, said polyols including mono- and/or polycyclic alcohols. The polyesters are characterized by a an Mn comprised between 5,000 and 25,000 Daltons, polydispersity (Mw/Mn) of up to 5, an hydroxyl number comprised between 0 and 150 mg KOH/g and an acid number comprised between 0 and 150 mg KOH/g. The polyester may be grafted with an acrylic copolymer; grafting may be done via free radical polymerization. The acrylic copolymer grafted polyester comprises between 55 and 95% by weight of polyester and between 5 and 45% by weight of acrylic copolymer. Coating compositions comprise between 10 and 99% by weight of polyester or acrylic modified material based on the total solid weight of the coating composition. The coating compositions may comprise a second polyester, having an acid number comprised between 15 and 25 mg KOH/g. The coating composition may comprise a solvent. WO 2019045944 A1 deals with both, solvent borne and water borne coating formulations comprising one or more crosslinker(s). Water borne coatings comprise a phosphatized polyester adhesion promotor.

WO 2016/073711 A1 discloses a coating composition comprising: (a) a first polyester material having a number-average molecular weight (Mn) of 500 to 5,500 Daltons, and (b) a second polyester material having a number-average molecular weight (Mn) of 6,000 to 100,000 Daltons. The first polyester is characterized by an acid value comprised between 0 and 100 mg KOH/g and a glass transition temperature comprised between 4° and 120° C. The second polyester is characterized by an hydroxyl value comprised between 0 and 100 mg KOH/g and a glass transition temperature comprised between 4° and 150° C. The coating composition may comprise solvents. The solvent may comprise water, an organic solvent, a mixture of water and an organic solvent or a mixture of organic solvents. Only solvent borne coatings, comprising a blend of a saturated polyester, a polyadipate and a phenolic crosslinker, are illustrated. The first polyester may be present in the coating composition in an amount of from 1 to 50% by weight, based on the total solid weight of the coating composition; the second polyester may be present in the coating composition in an amount of from 10 to 50% by weight, based on the total solid weight of the coating composition.

JP 2004292665 A discloses a water-based polyester containing at least 10 mole percentage trihydric or polyhydric polyalcohol having two or more primary hydroxy groups and one or more secondary hydroxy groups, based on 100 mole percentage total of polyalcohol components; the polyester has an acid value comprised between 8.5 and 34 mg KOH/g and a number average molecular weight (Mn) comprised between 1,000 and 100,000. The polyester is neutralized and dissolved in water. The coating composition comprises a crosslinking agent including phenol resins, amino resins, isocyanate compounds, epoxy resins, and the like, and a catalyst for the crosslinking reaction between the polyester and the crosslinking agent.

US2016/0115274 A1 discloses a curable polyester resin composition containing residues of: (a) polyhydroxyl compounds comprising 2,2,4,4-tetraalkylcyclobutane-1,3-diol (TACD) compounds and (b) polycarboxylic acid compounds that comprising a polycarboxylic anhydride compound, wherein the curable polyester resin has an acid number ranging from about 20 to about 120 mg KOH/g, a hydroxyl number ranging from greater than 0 to about 100 mg KOH/g, and an acid number:hydroxyl (AN:OHN) number ratio of at least 0.5:1. The curable polyester resin is suitable for waterborne, solvent borne and powder coating applications. Phenolic based crosslinking coating compositions that contain these curable polyester resins and a crosslinking catalyst are curable at elevated temperatures.

EP3208289 A1 relates to a coating composition comprising a liquid carrier and a binder comprising an aqueous dispersion of a polymer, and a vinyl polymer wherein the vinyl polymer is formed by polymerizing an ethylenically unsaturated component in the presence of the aqueous dispersion, and wherein the polymer of the aqueous dispersion and the vinyl polymer are linked together by one or more covalent linkages. From an extensive range of cited useful water-dispersible polymers only water-dispersible polyurethane is dealt with. The polyurethane is dispersed using salt groups. When acid or anhydride groups are used to impart water-dispersibility, the acid- or anhydride-functional polymer preferably has an acid number of at least 5, and no greater than 400 mg KOH/g. The covalent linkages are step-growth linkages or result from grafting together the vinyl polymer and the polyurethane polymer through a free-radical initiated polymerization reaction involving an aliphatic carbon-carbon double bond present in the polyurethane polymer (iodine value between 10 and 120). The coating composition includes 5 to 65% by weight of the binder, 20 to 60% by weight of water and 10 to 70% by weight of organic solvent and at least 1% by weight of crosslinker, based on the total weight of the coating composition.

U.S. Pat. No. 8,092,876 B2 discloses a coating composition including an emulsion polymerized latex polymer comprising a reaction product of an ethylenically unsaturated monomer component polymerized in the presence of an aqueous dispersion of a polymer salt, wherein the ethylenically unsaturated monomer component includes at least one oxirane functional group-containing monomer; and wherein the polymer salt comprises a salt of an amine and an acid- or anhydride-functional acrylic polymer, acid- or anhydride-functional polyurethane polymer, acid- or anhydride-functional polyester resin, acid- or anhydride-functional alkyd resin, or a combination thereof. Preferably the acid- or anhydride functional polymer is an acid- or anhydride-functional acrylic polymer.

WO 99/51696 discloses an aqueous dispersed coating comprising:

(a) between 0.1% and 40% by weight of a preformed, low molecular weight unsaturated polyester having a weight average molecular weight between 1000 and 3000, synthesized by esterifying excess molar equivalents of polyol with lesser molar equivalents of dicarboxylic acid;

(b) at least 20% by weight of in-situ, emulsion copolymerised ethylenic monomers, where the ethylenic monomers comprise at least 20% styrene based on the weight of the ethylenic monomers copolymerised; and (c) between 20% and 80% by weight of a carboxyl functional epoxy-acrylic graft copolymer dispersant, having an acid value greater than 30 mg KOH/g, the copolymer dispersant being 5% to 80% by weight epoxy resin and 20% and 95% by weight copolymerised ethylenically unsaturated monomer including carboxylic acid monomer;

where the polymeric binder is produced by dispersing the copolymer dispersant (c), the unsaturated polyester (a) and the monomers (b) into water and copolymerizing the monomers (b) to coreact with the unsaturated polyester. The epoxy resin preferably is a polyglycidyl ether of Bisphenol A type epoxy resin with an epoxy equivalent weight comprised between 2,000 and 10,000 and a number average molecular weight (Mn) comprised between 4,000 and 20,000.

WO 2012/162301 A1 discloses a coating composition comprising:

(a) a resinous binder, comprising an acrylic copolymer and/or a polyester; and (b) up to 10 percent by weight of a phosphatized polyester.

Water-based coating compositions, through at least partially neutralizing the acid groups of the acrylic copolymer and/or a polyester, are mentioned. Only a solvent-based coating composition comprising crosslinking agent is illustrated.

All above prior art coating compositions all mention and illustrate the co-use of one or more crosslinkers, in general including phenol resins, amino resins, isocyanate compounds, epoxy resins, and the like, and of catalysts for the crosslinking reaction between the resin and crosslinker(s).

AIM OF THE INVENTION

The present invention aims to provide aqueous self-crosslinkable polyester-based coating compositions for stoving applications that meet the performance demands of the coating industry, in particular, but not limited to, the coating industry for interior coatings of beer and beverage cans and of food packaging in general.

It is the aim of the present invention to provide aqueous coating compositions which, upon application and stoving, result in coatings having a solvent resistance, substrate adhesion and flexibility equal to or better than state-of-the-art products in the market, while abstaining said coating compositions from HSE/FDA suspect substances like Bisphenol A/F, formaldehyde and isocyanates.

SUMMARY OF THE INVENTION

The present invention discloses an aqueous coating composition comprising:

one or more anionic salt group(s) comprising unsaturated polyester(s) (SA1), said one or more anionic salt group(s) comprising unsaturated polyester(s) (SA1) being the reaction product of one or more acid groups comprising unsaturated polyester(s) (A1) and neutralizing agent, wherein at least part of the acid groups of the one or more unsaturated polyester(s) (A1) is converted into an anionic salt group;

said one or more acid groups comprising unsaturated polyester(s) (A1) being the reaction product of polyacids and a stoichiometric excess of polyols, wherein the ratio of hydroxyl equivalents over acid equivalents (mol/mol) is comprised between 1.05 and 1.6;

the hydroxyl groups of said polyols are connected by a linear, branched, or cyclic hydrocarbon moiety;

at least 30 mole percentage of said polyols are cyclic polyols;

at least one of said polyols comprises three or more hydroxyl groups and at least one of the polyacids comprises three or more acid groups; and said one or more acid groups comprising polyester(s) (A1) is (are) characterized by an acid number of at least 25 mg KOH/g, based on the total solid content of the one or more polyester(s) (A1);

or an anionic salt groups comprising blend (SB2), said anionic salt groups comprising blend (SB2) being the reaction product of an acid groups comprising blend (B2) and neutralizing agent, wherein at least part of the acid groups of the acid groups comprising blend (B2) is converted into anionic salt groups, said acid groups comprising blend (B2) comprising:

one or more unsaturated polyester(s) (A2); and one or more acid functional vinyl copolymer(s) (C) being the reaction product of copolymerized alpha, beta ethylenically unsaturated monomers, wherein said acid groups comprising blend (B2) is:

a physical blend of the one or more unsaturated polyester(s) (A2) and the one or more acid functional vinyl copolymer(s) (C), and/or the reaction product of the one or more unsaturated polyester(s) (A2) and one or more acid functional vinyl copolymer(s) (C), wherein said one or more unsaturated polyester(s) (A2) is (are) the reaction product of polyacids and a stoichiometric excess of polyols, wherein the ratio of hydroxyl equivalents over acid equivalents (mol/mol) is comprised between 1.01 and 2.0;

said one or more unsaturated polyester(s) (A2) is (are) characterized by an acid number comprised between 0.1 mg KOH/g and less than 25 mg KOH/g, based on the total solid content of the one or more polyester(s) (A2);

said one or more acid functional vinyl copolymer(s) (C) is (are) characterized by an acid value comprised between 50 and 250 mg KOH/g, based on the total solid content of the one or more copolymer(s) (C).

Preferred embodiments of the present invention disclose one or more of the following features:

blend (B2) comprises from 30 to 95% by weight of one or more unsaturated polyester(s) (A2); and from 5 to 70% by weight of one or more acid functional vinyl copolymer(s) (C); based on the total weight of (A2) and (C), where the sum of the weight percentages of (A2) and (C) equals to 100 wt %;

blend (B2) comprises the condensation product of hydroxyl groups of the one or more unsaturated polyester(s) (A2) and acid groups of the one or more acid functional vinyl copolymer(s) (C);

the unsaturated polyesters (A1) and (A2) are characterized by a weight average molecular weight (Mw), as measured by Gel Permeation Chromatography using tetrahydrofuran as solvent, of more than 5,000 g/mole; an unsaturated equivalent weight (UEW) comprised between 300 and 6,000 g/equiv.; and a glass transition temperature, as measured by Differential Scanning Calorimetry according to DIN EN 61006, method A of at least 40° C.;

the polyacids of the one or more unsaturated polyester(s) (A1) and (A2) comprise at least 5 mole percentage of ethylenically unsaturated diacids or their anhydride, being selected from the group consisting of alpha, beta ethylenically unsaturated dicarboxylic acids; alpha, beta ethylenically unsaturated (cyclic) acid anhydrides, unsaturated diacids comprising an isolated ethylenically unsaturated double bond; unsaturated (cyclic) acid anhydrides comprising an isolated ethylenically unsaturated double bond, and mixtures thereof;

the ethylenically unsaturated diacids or their anhydride are selected from the group consisting of alpha, beta ethylenically unsaturated diacids, alpha, beta ethylenically unsaturated (cyclic) acid anhydrides, and mixtures thereof;

the polyacids of the one or more unsaturated polyester(s) (A1) and (A2) comprise between 30 and 85 mole percentage of aromatic dicarboxylic acids and/or corresponding anhydrides being selected from the group consisting of orthophthalic acid, isophthalic acid, terephthalic acid, and mixtures thereof;

the cyclic polyols of the one or more unsaturated polyester(s) (A1) and the one or more unsaturated polyester (s) (A2) comprise five-membered and/or six-membered cyclic diols selected from the group consisting of monocyclic diols, polycyclic diols, and mixtures thereof;

the cyclic diols of the one or more unsaturated polyesters (A1) and of the one or more unsaturated polyester(s) (A2) comprise cyclic diols selected from the group consisting of 1,4-cyclohexanediol, 1,4-cyclohexanedimethanol, 1,3-cyclohexanedimethanol, 3,8-bis(hydroxymethyl)-tricyclo[5.2.1.$0^{2,6}$]decane, 4,8-bis(hydroxymethyl)-tricyclo[5.2.1.$0^{2,6}$]decane, 5,8-bis (hydroxymethyl)-tricyclo[5.2.1.$0^{2,6}$]decane, and mixtures thereof;

the polyols of the one or more polyester(s) (A1) and the one or more unsaturated polyester(s) (A2) comprise(s) one or more linear or branched aliphatic diol(s); and/or cyclic diols selected from the group consisting of 1,4-cyclohexanediol, 1,4-cyclohexanedimethanol, 1,3-cyclohexanedimethanol, 3,8-bis(hydroxymethyl)-tricyclo[5.2.1.$0^{2,6}$]decane, 4,8-bis(hydroxymethyl)-tricyclo [5.2.1.$0^{2,6}$]decane, and 5,8-bis(hydroxymethyl)-tricyclo[5.2.1.$0^{2,6}$]decane, and mixtures thereof;

the polyols of the one or more polyester(s) (A1) comprise(s) one or more polyol(s) having at least three hydroxyl groups; and the polyacids of the one or more polyester(s) (A1) comprise(s) one or more polyacid(s) having at least three carboxylic acid groups;

the one or more acid functional vinyl copolymer(s) (C) is (are) the polymerization product of alpha, beta ethylenically unsaturated monomers selected from the group consisting of alkyl (meth)acrylate monomers, vinyl monomers, allylic monomers, dialkyl esters of unsaturated diacids, (meth)acrylic acid, monoalkyl esters of unsaturated diacids, unsaturated diacids, and mixtures thereof;

the one or more acid functional vinyl copolymer(s) (C) is (are) characterized by a weight average molecular weight (Mw) of at least 5,000 g/mole, as measured by Gel Permeation Chromatography using tetrahydrofuran as solvent, and a glass transition temperature, as measured by Differential Scanning Calorimetry according to DIN EN 61006, method A, of at least 30° C.;

up to 75% by weight of the one or more acid groups comprising unsaturated polyester(s) (A1) in the aqueous coating composition is replaced by one or more acid groups comprising saturated polyester(s) (A3), forming polyester blend (B1), and up to 75% by weight of the one or more acid groups comprising unsaturated polyester(s) (A2) is replaced by one or more acid groups comprising saturated polyester(s) (A3), forming, in combination with one or more acid functional vinyl copolymer (C), the blend (B2), the one or more saturated polyester(s) (A3) being the reaction product of polyacids and a stoichiometric excess of polyols, and said one or more saturated polyester(s) (A3) being characterized by a glass transition temperature, as measured by Differential Scanning Calorimetry according to DIN EN 61006, method A, of at least 10° C.; and a dynamic viscosity, according to DIN EN ISO 3219 (10 $s^{-1}$ at 23° C.), at a non-volatile matter of 60±0.5% measured according to DIN 55671 (foil method), 180° C., 10 min., comprised between 5,000 and 25,000 mPa·s;

the anionic salt groups comprising polyester blend (SB1) in the aqueous coating composition is the reaction product of an acid groups comprising polyester blend (B1), of polyesters (A1) and (A3), and neutralizing agent, wherein at least part of the acid groups is converted into anionic salt groups, said polyester blend (B1) of (A1) and (A3) comprising between 25 and 99% by weight of one or more acid groups comprising unsaturated polyester(s) (A1); and between 1 and 75% by weight of one or more acid groups comprising saturated polyester(s) (A3); based on the total weight of (A1) and (A3), and where the sum of the weight percentages of (A1) and (A3) equals to 100 wt %;

the anionic salt groups comprising blend (SB2) in the aqueous coating composition is the reaction product of acid groups comprising blend (B2) and neutralizing agent, wherein at least part of the acid groups is converted into anionic salt groups, the blend (B2) comprising:

between 30 and 95% by weight of polyesters (A2), or of a mixture of acid groups comprising polyesters (A2) and (A3), between 5 and 70% by weight of acid functional vinyl copolymer (C);

based on the total of (A2) and (C), or on the total of (A2), (A3) and (C), the sum of (A2) and (C), or of (A2), (A3) and (C), being 100% by weight; and the mixture of acid groups comprising polyesters (A2) and (A3) comprising between 25 and 99% by weight of one or more acid groups comprising unsaturated polyester(s) (A2); and between 1 and 75% by weight of one or more saturated polyester(s) (A3), based on the total of polyesters (A2) and (A3), the sum of polyesters (A2) and (A3) being 100% by weight;

the total unsaturated equivalent weight (tUEW) based on the total weight of (A1), (A2), (A3) and (C) in the aqueous coating composition is comprised between 300 and 6,000 g/equiv.;

the neutralizing agent is a tertiary amine selected from the group consisting of trimethyl amine, dimethylethanol amine, methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof;

the aqueous coating composition of the invention comprises from 30 to 60% by weight of one or more anionic salt group(s) comprising unsaturated polyester(s) (SA1); or an anionic salt groups comprising blend (SB1) of one or more unsaturated polyester(s) (A1) and one or more saturated polyester(s) (A3); or an anionic salt groups comprising blend (SB2) of one or more unsaturated polyester(s) (A2) and one or more acid functional vinyl copolymers(s) (C), wherein said blend (SB2) is a physical blend and/or a reaction product, preferably a reaction product; or an anionic salt groups comprising blend (SB2) of one or more unsaturated polyester(s) (A2), one or more saturated polyester(s) (A3), and one or more acid functional vinyl copolymers(s) (C), wherein said blend (SB2) is a physical blend and/or a reaction product, preferably a reaction product;

the aqueous coating composition comprises one or more organic solvent(s) and one or more additive(s) selected from the group consisting of carriers, additional polymers, emulsifiers, pigments, metal powders or paste, fillers, anti-migration aids, anti-microbials, extenders, lubricants, coalescents, wetting agents, biocides, plasticizers, crosslinking catalysts, antifoaming agents, colorants, waxes, anti-oxidants, anticorrosion agents, flow control agents, thixotropic agents, dispersants, adhesion promoters, UV stabilizers and scavenger agents;

the aqueous coating composition comprises between 0.05% and 1.5% by weight of an organometallic compound (as an adhesion promotor), preferably a titanium complex in the form of a salt, based on the weight of nonvolatile material in the coating composition;

the aqueous coating composition comprises a crosslinking catalyst, the crosslinking catalyst comprising a metal cation and the amount of metal cation based on the weight of non-volatile material in the coating composition is comprised between 0.01 and 0.50% by weight, or the aqueous coating composition comprises 0.0% of crosslinking catalyst.

The present invention further discloses a substrate selected from the group consisting of metal, glass, polymers, composites, concrete, ceramics and engineered wood, preferably a metal substrate, coated with the aqueous coating composition of the invention; preferably the metal substrate is a metal coil or can, preferably a can for food and beverage applications.

The present invention further discloses a method for producing a coated metal substrate comprising the steps of applying the coating composition of the invention on at least one side of the, optionally pretreated and/or primer comprising, metal substrate, at a coating thickness adjusted to obtain a dry coating thickness of less than 20 μm; stoving the applied coating composition at a temperature of at least 150° C. for a period of at least 20 seconds, to form the metal substrate coated with the cured coating layer.

The present invention further discloses a method for producing coated can bodies and can ends comprising the steps of cutting the coated metal substrate into metal pieces of desired dimensions and shaping to form a can body and can ends, ready to be assembled, or cutting the coated metal substrate into metal pieces of desired dimensions and shape and embossing a metal piece into a can body and cutting the can ends into the desired shape, ready to be assembled.

The present invention further discloses the use of the aqueous coating composition of the invention for coating a metal substrate.

DETAILED DESCRIPTION OF THE INVENTION

The coating composition according to the present invention comprises:

one or more anionic salt group(s) comprising unsaturated polyester(s) (SA1), said one or more anionic salt group(s) comprising unsaturated polyester(s) (SA1) being the reaction product of one or more acid groups comprising unsaturated polyester(s) (A1) and neutralizing agent, wherein at least part of the acid groups of the one or more unsaturated polyester(s) (A1) is converted into anionic salt groups;

or an anionic salt groups comprising blend (SB1) being the reaction product of an acid groups comprising blend (B1) and neutralizing agent, wherein at least part of the acid groups of the acid groups comprising blend (B1) is converted into anionic salt groups, said acid groups comprising blend (B1) comprising:

one or more acid group(s) comprising unsaturated polyester(s) (A1), and one or more acid group(s) comprising saturated polyester(s) (A3);

or an anionic salt groups comprising blend (SB2) being the reaction product of an acid groups comprising blend (B2) and neutralizing agent, wherein at least part of the acid groups of the acid groups comprising blend (B2) is converted into anionic salt groups, said acid groups comprising blend (B2) comprising:

a physical mixture (or blend) of:

one or more unsaturated polyester(s) (A2), and one or more acid group(s) comprising copolymer(s) (C) being the reaction product of copolymerized alpha, beta ethylenically unsaturated monomers;

and/or the reaction product of:

one or more unsaturated polyester(s) (A2), and one or more acid functional vinyl copolymer(s) (C), wherein the reaction product of (A2) and (C) is the condensation product of hydroxyl groups of the one or more unsaturated polyester(s) (A2) and acid groups of the one or more acid functional vinyl copolymer(s) (C);

preferably said acid groups comprising blend (B2) comprises the reaction product of one or more unsaturated polyester(s) (A2), and one or more acid functional vinyl copolymer(s) (C), wherein the reaction product of (A2) and (C) is the condensation product of hydroxyl groups of the one or more unsaturated polyester(s) (A2) and acid groups of the one or more acid functional vinyl copolymer(s) (C);

or an anionic salt groups comprising blend (SB2) being the reaction product of an acid groups comprising blend (B2) and neutralizing agent, wherein at least part of the acid groups of the acid groups comprising blend (B2) is converted into anionic salt groups, said acid groups comprising blend (B2) comprising:

a physical mixture (or blend) of:

one or more unsaturated polyester(s) (A2), one or more saturated polyester(s) (A3), and one or more acid group(s) comprising copolymer(s) (C) being the reaction product of copolymerized alpha, beta ethylenically unsaturated monomers; and/or the reaction product of:

one or more unsaturated polyester(s) (A2), one or more saturated polyester(s) (A3), and one or more acid functional vinyl copolymer(s) (C), wherein the reaction product of (A2), (A3), and (C) is the condensation product of hydroxyl groups of the one or more unsaturated polyester(s) (A2) and of the one or more saturated polyester(s) (A3) and acid groups of the one or more acid functional vinyl copolymer(s) (C);

preferably said acid groups comprising blend (B2) comprises the reaction product of one or more unsaturated polyester(s) (A2), one or more saturated polyester(s) (A3), and one or more acid functional vinyl copolymer(s) (C), wherein the reaction product of (A2), (A3), and (C) is the condensation product of hydroxyl groups of the one or more unsaturated polyester(s) (A2) and of the one or more saturated polyester(s) (A3) and acid groups of the one or more acid functional vinyl copolymer(s) (C).

In the present description, "coating composition" is also referred to as "coating formulation".

Throughout the present description, "acid groups comprising copolymer(s) (C)" are also referred to as "acid functional vinyl copolymer(s) (C)".

Throughout the present description, "reaction product" is also referred to as "chemical reaction product", or "chemical hybrid".

In the context of the present description, the wording "an acid groups comprising blend (B1)" refers to a blend (B1) comprising more than one acid group, the acid groups being part of the polyesters (A1) and/or (A3).

In the context of the present description, the wording "an acid groups comprising blend (B2)" refers to a blend (B2) comprising more than one acid group, the acid groups being part of the polyesters (A2) and/or vinyl copolymers (C), or of the polyesters (A2) and/or (A3) and/or vinyl copolymers (C).

In the context of the present description, the wording "an anionic salt group(s) comprising unsaturated polyester (SA1)" refers to an unsaturated polyester (SA1) comprising one or more anionic salt group(s). It is also referred to as "an at least partially neutralized acid group(s) comprising unsaturated polyester (SA1)".

By "one or more anionic salt group(s) comprising unsaturated polyester(s) (SA1)", in the present invention, is hence meant that one of the unsaturated polyester(s) (SA1); or more than one of the unsaturated polyester(s) (SA1); or all of the unsaturated polyester(s) (SA1)

comprises one or more anionic salt group(s).

In the context of the present description, the wording "an anionic salt groups comprising blend (SB1), respectively (SB2)" refers to a blend (SB1), respectively (SB2), said blend comprising more than one anionic salt groups. (SB1) and (SB2) are also referred to as "an at least partially neutralized acid groups comprising blend".

More particularly, by "an anionic salt groups comprising blend (SB1)" in the present invention is meant that one of the unsaturated polyester(s) (SA1), or more than one of the unsaturated polyester(s) (SA1), or all of the unsaturated polyester(s) (SA1), of polyester blend (SB1) comprises anionic salt groups;

and/or that one of the saturated polyester(s) (SA3), or more than one of the saturated polyester(s) (SA3), or all of the saturated polyester(s) (SA3), of polyester blend (SB1) comprises anionic salt groups.

And, more particularly, by "an anionic salt groups comprising blend (SB2)" in the present invention is meant that one of the unsaturated polyester(s) (SA2), or more than one of the unsaturated polyester(s) (SA2), or all of the unsaturated polyester(s) (SA2), of blend (SB2) comprises anionic salt groups;

and/or that one of the acid functional vinyl copolymer(s) (SC), or more than one of the acid functional vinyl copolymer(s) (SC), or all of the acid functional vinyl copolymer(s) (SC), of blend (SB2) comprises anionic salt groups;

or, that one of the unsaturated polyester(s) (SA2), or more than one of the unsaturated polyester(s) (SA2), or all of the unsaturated polyester(s) (SA2), of blend (SB2) comprises anionic salt groups;

and/or that one of the saturated polyester(s) (SA3), if present, or more than one of the saturated polyester(s) (SA3), if present, or all of the saturated polyester(s) (SA3), if present, of blend (SB2) comprises anionic salt groups;

and/or that one of the acid functional vinyl copolymer(s) (SC), or more than one of the acid functional vinyl copolymer(s) (SC), or all of the acid functional vinyl copolymer(s) (SC), of blend (SB2) comprises anionic salt groups.

The one or more acid groups comprising unsaturated polyester(s) (A1) is (are) the reaction product of polyacids and a stoichiometric excess of polyols, wherein the ratio of hydroxyl equivalents over acid equivalents (mol/mol) is at least 1.05 and is preferably comprised between 1.05 and 1.6, more preferably between 1.1 and 1.6, even more preferably between 1.2 and 1.5, most preferably between 1.3 and 1.4.

The one or more acid groups comprising unsaturated polyester(s) (A1) is (are) characterized by an acid value of at least 25 mg KOH/g, preferably comprised between 25 and 60 mg KOH/g, more preferably between 25 and 50 mg KOH/g, based on the total solid content of the one or more acid groups comprising unsaturated polyester(s) (A1).

Preferably, the one or more acid groups comprising unsaturated polyester(s) (A1) is (are) the reaction product of:

- a polyacid constituent comprising:
  - from 30 to 85 mole percentage, preferably from 30 to 60 mole percentage, more preferably from 40 to 50 mole percentage, of one or more aromatic dicarboxylic acid(s) selected from the group consisting of phthalic acid or its anhydride, isophthalic acid, terephthalic acid, 2,6-naphthalene dicarboxylic acid, 2,7-naphthalene dicarboxylic acid, and mixtures thereof, preferably selected from the group consisting of phthalic acid or its anhydride, isophthalic acid, terephthalic acid and mixtures thereof;
  - at least 5 mole percentage, more particularly from 5 to 60 mole percentage, preferably from 30 to 60 mole percentage, more preferably from 40 to 50 mole percentage, of one or more ethylenically unsaturated diacid(s) or the anhydride thereof, selected from the group selected from the group consisting of maleic acid, fumaric acid, itaconic acid, mesaconic acid, citraconic acid, tetrahydrophthalic acid, 5-norbornene-2,3-dicarboxylic acid (also referred to as nadic acid), methylnadic acid, and their anhydrides, and mixtures thereof; and
  - from 4 to 12 mole percentage, preferably from 6 to 10 mole percentage, of one or more polycarboxylic acid(s) having at least three carboxylic acid groups, selected from the group consisting of trimellitic acid, pyromellitic acid, citric acid and their anhydrides, and mixtures thereof, preferably selected from the group consisting of trimellitic acid, pyromellitic acid, and their anhydrides, and mixtures thereof,
  - the sum of mole percentages of the polyacid constituents being 100%; and
- a polyol constituent comprising:
  - from 30 to 60 mole percentage, preferably from 40 to 50 mole percentage, of one or more linear or branched aliphatic diol(s), selected from the group consisting of ethylene glycol, 1,3-propanediol, 1,4-butanediol, 1,5-pentandiol, 1,6-hexanediol, 2-ethyl-2-butyl-1,3-propanediol, 2-methyl-1,3-propanediol, neopentyl glycol, neopentyl glycol hydroxypivalate, and mixtures thereof, preferably selected from the group consisting of ethylene glycol, 1,3-propanediol, 1,4-butanediol, 1,6-hexanediol, 2-ethyl-2-butyl-1,3-propanediol, 2-methyl-1,3-propanediol, neopentyl glycol, neopentyl glycol hydroxypivalate, and mixtures thereof;
  - at least 30 mole percentage cyclic polyols, more particularly from 30 to 60 mole percentage, preferably from 40 to 50 mole percentage, of one or more five-membered and/or six-membered cyclic diol(s) selected from the group consisting of monocyclic diols, polycyclic diols, and mixtures thereof; preferably selected from the group consisting of 1,4-cyclohexanedimethanol, 1,4-cyclohexanediol, 1,3-cyclohexanedimethanol, 3,8-bis(hydroxymethyl)-tricyclo[5.2.1.02,6]decane, 4,8-bis(hydroxylmethyl)-tricyclo[5.2.1.02,6]decane, and 5,8-bis(hydroxymethyl)-tricyclo[5.2.1.02,6]decane, and mixtures thereof; and
  - from 5 to 15 mole percentage, preferably from 8 to 12 mole percentage, of one or more polyol(s) having at least three hydroxyl groups, selected from the group consisting of trimethylolpropane, trimethylolethane, pentaerythritol, glycerol, and mixtures thereof,
  - the sum of mole percentages of the polyol constituents being 100%.

Alternatively and preferred, where possible, the ethylenically unsaturated diacid(s) or the anhydride thereof (e.g. itaconic acid), the polycarboxylic acid(s) having at least three carboxylic acid groups (e.g. citric acid), the linear or branched aliphatic diol(s) (e.g. 1,3-propanediol and/or 1,5-pentandiol) and/or the polyol(s) having at least three hydroxyl groups (e.g. glycerol) are obtained from renewable feedstock.

In the context of the present description, "renewable feedstock" refers to natural resources which will replenish to replace the portion depleted by usage and consumption, either through natural reproduction or other recurring processes (in a finite amount of time in a human time scale). Substances or mixtures of substances obtained from such renewable feedstock should have in total a bio-based carbon content of more than 20% by weight of total carbon content of the substance or mixture, the bio-carbon content being determined using the ASTM D6866-20 standard.

The one or more unsaturated polyester(s) (A2) is (are) the reaction product of polyacids and a stoichiometric excess of polyols, wherein the ratio of hydroxyl equivalents over acid equivalents (mol/mol) is at least 1.01, and is preferably comprised between 1.01 and 2.0, more preferably between 1.05 and 2.0, even more preferably between 1.05 and 1.85, and most preferably between 1.05 and 1.7.

The one or more unsaturated polyester(s) (A2) is (are) characterized by an acid value of less than 25 mg KOH/g, preferably less than 20 mg KOH/g, more preferably less than 15 mg KOH/g, and of more than 0.1 mg KOH/g, preferably more than 0.5 mg KOH/g, more preferably more than 1 mg KOH/g, based on the total solid content of the one or more polyester(s) (A2). More particularly, the acid value of the one or more unsaturated polyester(s) (A2) is comprised between 0.1 and 25 mg KOH/g, preferably between 0.5 and 20 mg KOH/g, more preferably between 1 and 15 mg KOH/g, based on the total solid content of the one or more polyester(s) (A2).

Preferably, the one or more unsaturated polyester(s) (A2) is (are) the reaction product of

- a polyacid constituent comprising:
  - from 30 to 85 mole percentage, preferably from 40 to 85 mole percentage, more preferably from 50 to 80 mole percentage, of one or more aromatic dicarboxylic acid(s) selected from the group consisting of phthalic acid or its anhydride, isophthalic acid, terephthalic acid, 2,6-naphthalene dicarboxylic acid, 2,7-naphthalene dicarboxylic acid, and mixtures thereof, preferably selected from the group consisting of phthalic acid or its anhydride, isophthalic acid, terephthalic acid and mixtures thereof; and
  - at least 5 mole percentage more particularly from 5 to 50 mole percentage, preferably from 10 to 40 mole percentage, of one or more ethylenically unsaturated diacid(s) or the anhydride thereof selected from the group consisting of maleic acid, fumaric acid, itaconic acid, mesaconic acid, citraconic acid, tetrahydrophthalic acid, 5-norbornene-2,3-dicarboxylic acid (also referred to as nadic acid), methylnadic acid, and their anhydrides, and mixtures thereof, the sum of mole percentages of the polyacid constituents being 100%; and a polyol constituent comprising:

from 5 to 30 mole percentage, preferably from 10 to 20 mole percentage, of one or more linear or branched aliphatic diol(s) or polyalkylene glycols, preferably of one or more linear or branched aliphatic diol(s), said linear or branched aliphatic diol(s) being selected from the group consisting of ethylene glycol, 1,3-propanediol, 1,4-butanediol, 1,6-hexanediol, 2-ethyl-2-butyl-1,3-propanediol, 2-methyl-1,3-propanediol, neopentyl glycol, neopentyl glycol hydroxypivalate, and mixtures thereof;

said polyalkylene glycols being selected from the group consisting of diethylene glycol, triethylene glycol, tetraethylene glycol, dipropylene glycol, tripropylene glycol, tetrapropylene glycol, dibutylene glycol, tributylene glycol, tetrabutylene glycol, and mixtures thereof; and from 60 to 95 mole percentage, preferably from 70 to 90 mole percentage, of one or more five-membered and/or six-membered cyclic diols selected from the group consisting of monocyclic diols, polycyclic diols, and mixtures thereof, preferably selected from the group consisting of 1,4-cyclohexanedimethanol, 1,4-cyclohexanediol, 1,3-cyclohexanedimethanol, 3,8-bis(hydroxymethyl)-tricyclo[5.2.1.02,6]decane, 4,8-bis(hydroxymethyl)-tricyclo[5.2.1.02,6]decane, and 5,8-bis(hydroxymethyl)-tricyclo[5.2.1.02,6]decane, and mixtures thereof, the sum of mole percentages of the polyol constituents being 100%.

Alternatively and preferred, where possible, the ethylenically unsaturated diacid(s) or the anhydride thereof (e.g. itaconic acid), the linear or branched aliphatic diol(s) or polyalkylene glycols (e.g. 1,3-propanediol and/or 1,5-pentandiol) are obtained from renewable feedstock.

The one or more unsaturated polyester(s) (A1) and (A2) is (are) characterized by an unsaturated equivalent weight (UEW) comprised between 300 and 6,000 g/equiv., preferably between 400 and 4,000 g/equiv., more preferably between 500 and 2,000 g/equiv., most preferably between 500 and 1,600 g/equiv., and a glass transition temperature, as measured by Differential Scanning Calorimetry, according to DIN EN 61006, method A, of at least 40° C., preferably at least 45° C., more preferably at least 50° C., wherein each of the one or more (A1) or each of the one or more (A2) answer said glass transition temperature ranges, or wherein the blend of one or more (A1) or the blend of one or more (A2) answers said glass transition temperature ranges.

Up to 75% by weight of the one or more acid groups comprising unsaturated polyester(s) (A1) may be replaced by one or more acid groups comprising saturated polyester(s) (A3), forming polyester blend (B1).

Up to 75% by weight of the one or more acid groups comprising unsaturated polyester(s) (A2) may be replaced by one or more acid groups comprising saturated polyester(s) (A3), forming, in combination with the one or more acid functional copolymer (C), the blend (B2).

Preferably, the total unsaturated equivalent weight (tUEW) based on the total weight of (A1), (A2), (A3) and (C) is between 300 and 6,000 g/equiv., more preferably between 400 and 4,000 g/equiv., and even more preferably between 450 and 3,500 g/equiv.

The one or more acid groups comprising saturated polyester(s) (A3) is (are) the reaction product of polyacids and a stoichiometric excess of polyols, wherein the ratio of hydroxyl equivalents over acid equivalents (mol/mol) is comprised between 1.05 and 1.5, preferably between 1.1 and 1.4, more preferably between 1.2 and 1.3.

The one or more saturated polyester(s) (A3) can be characterized by a glass transition temperature, as measured by Differential Scanning Calorimetry, according to DIN EN 61006, method A, of at least 10° C.; and a weight average molecular weight (Mw) of at least 5,000 g/mole, as measured by Gel Permeation Chromatography using tetrahydrofuran as solvent.

Preferably, the one or more saturated polyester(s) (A3) is (are) characterized by a glass transition temperature, as measured by Differential Scanning Calorimetry, according to DIN EN 61006, method A, of at least 10° C., preferably at least 15° C., more preferably at least 20° C., even more preferably is comprised between 1° and 50° C., wherein each of the one or more (A3) meet said glass transition temperature criteria, or wherein the blend of one or more (A3) meets said glass transition temperature criteria; and a dynamic viscosity, according to DIN EN ISO 3219 (10 $s^{-1}$ at 23° C.), at a non-volatile matter of 60±0.5% measured according to DIN 55671 (foil method), 180° C., 10 min., comprised between 5,000 and 25,000 mPa·s.

Preferably, the one or more polyester(s) (A3) has (have) an acid value of more than 5 mg KOH/g, more preferably comprised between 10 and 60 mg KOH/g, even more preferably between 15 and 50 mg KOH/g, based on the total of the one or more polyester(s) (A3).

Preferably, the one or more acid groups comprising saturated polyester(s) (A3) is (are) the reaction product of:

a polyacid constituent comprising:

from 25 to 65 mole percentage, preferably from 35 to 55 mole percentage, of one or more aromatic dicarboxylic acid(s) selected from the group consisting of phthalic acid or its anhydride, isophthalic acid, terephthalic acid, 2,6-naphthalene dicarboxylic acid, 2,7-naphthalene dicarboxylic acid, and mixtures thereof, preferably selected from the group consisting of phthalic acid or its anhydride, isophthalic acid, terephthalic acid and mixtures thereof;

from 25 to 65 mole percentage, preferably from 35 to 55 mole percentage, of one or more saturated (cyclo) aliphatic diacid(s) or their anhydride selected from the group consisting of succinic acid or its anhydride, glutaric acid, adipic acid, pimelic acid, suberic acid, azelaic acid, sebacic acid, 1,2-cyclohexanedicarboxylic acid or its anhydride, 1,3-cyclohexanedicarboxylic acid, 1,4-cyclohexanedicarboxylic acid, and mixtures thereof; and from 0 to 20 mole percentage, preferably from 5 to 15 mole percentage, of one or more polycarboxylic acid(s) having at least three carboxylic acid groups, selected from the group consisting of trimellitic acid, pyromellitic acid, citric acid and their anhydrides, and mixtures thereof, preferably selected from the group consisting of trimellitic acid, pyromellitic acid, and their anhydrides, and mixtures thereof, the sum of mole percentages of the polyacid constituents being 100%;

and a polyol constituent comprising:

from 25 to 65 mole percentage, preferably from 35 to 55 mole percentage, of one or more linear or branched aliphatic diol(s) or polyalkylene glycols, preferably of one or more linear or branched aliphatic diol(s), said linear or branched aliphatic diol(s) being selected from the group consisting of ethylene glycol, 1,3-propanediol, 1,4-butanediol, 1,5-pentandiol, 1,6-hexanediol, 2-ethyl-2-butyl-1,3-propanediol, 2-methyl-1.3-propanediol, neopentyl glycol, neopentyl glycol hydroxypivalate, and mixtures thereof, preferably selected from the group consisting of ethylene glycol, 1,3-propanediol, 1,4-butanediol, 1,6-hexanediol, 2-ethyl-2-butyl-1,3-propanediol, 2-methyl-1,3-propanediol, neopentyl glycol, neopentyl glycol hydroxypivalate, and mixtures thereof;

said polyalkylene glycols being selected from the group consisting of diethylene glycol, triethylene glycol, tetraethylene glycol, dipropylene glycol, tripropylene glycol, tetrapropylene glycol, dibutylene glycol, tributylene glycol, tetrabutylene glycol, and mixtures thereof;

from 25 to 65 mole percentage, preferably from 35 to 55 mole percentage, of one or more five-membered and/or six-membered cyclic diol(s)s selected from the group consisting of monocyclic diols, polycyclic diols, and mixtures thereof, preferably selected from the group consisting of 1,4-cyclohexanedimethanol, 1,4-cyclohexanediol, 1,3-cyclohexanedimethanol, 3,8-bis(hydroxymethyl)-tricyclo[5.2.1.02,6]decane, 4,8-bis(hydroxymethyl)-tricyclo[5.2.1.02,6]decane, and 5,8-bis(hydroxymethyl)-tricyclo[5.2.1.02,6]decane, and mixtures thereof; and from 0 to 20 mole percentage, preferably from 0 to 15 mole percentage, of one or more polyol(s) having at least three hydroxyl groups, selected from the group consisting of trimethylolpropane, trimethylolethane, pentaerythritol, glycerol, and mixtures thereof, the sum of mole percentages of the polyol constituents being 100%.

Alternatively and preferred, where possible, the saturated (cyclo)aliphatic diacid(s) or their anhydride (e.g. succinic acid and/or sebacic acid), the polycarboxylic acid(s) having at least three carboxylic acid groups (e.g. citric acid), the linear or branched aliphatic diol(s) or polyalkylene glycols (e.g. 1,3-propanediol and/or 1,5-pentandiol) and/or the polyol(s) having at least three hydroxyl groups (e.g. glycerol) are obtained from renewable feedstock.

Preferably the one or more polyester(s) (A1) and (A3) is (are) branched, i.e. at least part of the polyacids comprise polyacids having three or more acid groups per molecule and/or at least part of the polyols comprise polyols having three or more hydroxyl groups per molecule.

Preferably the one or more polyester(s) (A2) is (are) linear i.e. the polyacids are diacids and/or the polyols are diols. In other words, the polyacids do not comprise polyacids having three or more acid groups per molecule, and the polyols do not comprise polyols having three or more hydroxyl groups per molecule.

Preferably the polyols for the preparation of the one or more acid groups comprising unsaturated polyester(s) (A1) comprise two or more hydroxyl groups separated by a linear, branched or cyclic hydrocarbon moiety (i.e. the hydroxyl groups of said polyols are connected by a linear, branched, or cyclic hydrocarbon moiety); more preferably the polyols for the preparation of unsaturated polyester (A1) do not comprise polyalkylene glycols.

Preferably the ethylenically unsaturated diacids or the anhydrides for the preparation of the one or more unsaturated polyester(s) (A1) and (A2) are selected from the group consisting of alpha, beta ethylenically unsaturated dicarboxylic acids, alpha, beta ethylenically unsaturated (cyclic) acid anhydrides, unsaturated diacids comprising an isolated ethylenically unsaturated double bond, unsaturated (cyclic) acid anhydrides comprising an isolated ethylenically unsaturated double bond, and mixtures thereof, wherein:

alpha, beta ethylenically unsaturated dicarboxylic acids and alpha, beta ethylenically unsaturated (cyclic) acid anhydrides are selected from the group consisting of maleic acid, maleic anhydride, fumaric acid, itaconic acid, itaconic anhydride, mesaconic acid, citraconic acid, citraconic anhydride, and mixtures thereof; and unsaturated diacids comprising an isolated ethylenically unsaturated double bond and unsaturated (cyclic) acid anhydrides comprising an isolated ethylenically unsaturated double bond are selected from the group consisting of tetrahydrophthalic acid, tetrahydrophthalic anhydride, 5-norbornene-2,3-dicarboxylic acid (also referred to as nadic acid), 5-norbornene-2,3-dicarboxylic anhydride, methyl-5-norbornene-2,3-dicarboxylic acid (also referred to as methylnadic acid), methyl-5-norbornene-2,3-dicarboxylic anhydride, and mixtures thereof.

More preferably the ethylenically unsaturated diacids or the anhydrides for the preparation of the one or more unsaturated polyester(s) (A1) and (A2) are selected from the group consisting of maleic acid, maleic anhydride, tetrahydrophthalic acid, tetrahydrophthalic anhydride, and mixtures thereof.

Most preferably the ethylenically unsaturated diacids or the anhydrides for the preparation of the one or more unsaturated polyester(s) (A1) and (A2) are selected from the group consisting of alpha, beta ethylenically unsaturated diacids, alpha, beta ethylenically unsaturated (cyclic) acid anhydrides, and mixtures thereof, even most preferably are selected from the group consisting of maleic acid, maleic anhydride, fumaric acid, and mixtures thereof.

Preferably the cyclic diols for the preparation of the polyesters (A1) to (A3) are selected from the group consisting of 1,4-cyclohexanedimethanol, 3,8-bis(hydroxymethyl)-tricyclo[5.2.1.$0^{2,6}$]decane, 4,8-bis(hydroxymethyl)-tricyclo[5.2.1.$0^{2,6}$]decane, and 5,8-bis(hydroxymethyl)-tricyclo[5.2.1.$0^{2,6}$]decane, and mixtures thereof.

The cyclic diols for the preparation of the polyesters (A1) to (A3) may be partially or entirely replaced by one or more hetero-cyclic diol(s), such as for example hetero-bicyclic diols selected from the group consisting of isosorbide, isomannide, isoidide, and derivatives thereof.

In the present description, by the wording "hetero-bicyclic diols" it is referred to bicyclic diols having a bicyclic ring, wherein said ring comprises at least one hetero atom, i.e. wherein in said ring one or more hydrocarbon(s) (—$CH_2$—) is (are) replaced by an hetero atom (such as for example oxygen).

Alternatively and preferred, where possible, the hetero-cyclic diol(s) (e.g. isosorbide, isomannide and/or isoidide) are obtained from renewable feedstock.

Preferably the polyalkylene glycols for the preparation of the unsaturated polyesters (A2) and the saturated (A3) are selected from the group consisting diethylene glycol, triethylene glycol, tripropylene glycol, and mixtures thereof.

Preferably the one or more unsaturated polyester(s) (A1) and (A2), and the saturated polyesters (A3), are characterized by a Weight Average Molecular Weight (Mw) of more than 5,000 g/mole, preferably comprised between 10,000 and 250,000 g/mole, more preferably between 20,000 and 230,000 g/mole, even more preferably between 25,000 and 200,000 g/mole, most preferably between 30,000 and 180,000 g/mole, still even more preferably between 30,0000 and 160,000 g/mole;

a polydispersity (DPI=Mw/Mn) of at least 3, more preferably at least 4, as measured by Gel Permeation Chromatography using tetrahydrofuran as solvent; and an intrinsic viscosity, in chloroform, according to DIN 51562 T1, comprised between 10 and 50 ml/g, more preferably between 15 and 45 ml/g, even more preferably between 20 and 40 ml/g, wherein each of the one or more (A1) or (A2) or (A3) answer said intrinsic viscosity ranges, or wherein the blend of the one or more (A1) or (A2) or (A3) answers said intrinsic viscosity ranges.

The one or more polyester(s) (A1) to (A3) may be prepared in a single or multistep condensation process.

Preferably the one or more saturated polyester(s) (A3) is (are) prepared in a single step process, wherein one or more polyacid(s) is (are) mixed with a stoichiometric excess of one or more polyol(s), said polyol(s) preferably being in the liquid state, optionally through heating up, and are reacted at a temperature comprised between 19° and 240° C. until the target acid number is reached.

Preferably the one or more unsaturated polyester(s) (A1) and (A2) is (are) prepared in a two-step process, wherein one or more polyacid(s) is (are) mixed with a stoichiometric excess of one or more polyol(s), said polyol(s) preferably being in the liquid state, optionally through heating up, and reacted at a temperature comprised between 20° and 250° C. until a target acid is obtained. Subsequently the reaction mixture is cooled down to a temperature comprised between 16° and 190° C. whereupon one or more alpha, beta ethylenically unsaturated dicarboxylic acid(s), or their anhydride, and/or one or more dicarboxylic acid(s) comprising an isolated ethylenically unsaturated double bond, or their anhydride, are added, whereupon condensation is continued, optionally under azeotropic conditions in the presence of a suitable hydrocarbon solvent, at a temperature comprised between 16° and 190° C. until a target acid number is obtained.

The one or more polyester(s) (A1), (A2) and (A3) preferably is (are) prepared in the presence of one or more esterification catalyst(s).

Examples of an esterification catalyst are tin derivatives, such as dibutyltin dilaurate, dibutyltin oxide, monobutyltin oxide, or n-butyltin trioctanoate, or titanium derivatives, such as tetrabutoxytitanium (also referred to as tetrabutyltitanate, butyltitanate, or titanium butoxide). Preferred catalysts for the polyester preparation are tin derivatives.

From 0 to 1% of phenolic derivatives, such as IRGANOX®1010 (BASF), alone or in a mixture with various stabilizers, such as those of the phosphite type, such as trialkyl phosphite (WESTON™), may be added to the esterification mixture at any step of the reaction, i.e. at the beginning, during or at the end of the polyesterification.

To the one or more unsaturated polyester(s) (A1) and/or to the one or more saturated polyester(s) (A3), once the target acid number is reached, one or more suitable organic solvent(s) may be added to adjust the viscosity to a target value, and one or more neutralizing agent(s) is (are) added in order to neutralize at least part of the acid groups, converting them into anionic salt groups.

Suitable organic solvents include aliphatic hydrocarbons (e.g. mineral spirits, kerosene, high flashpoint VM&P naphtha, and the like); aromatic hydrocarbons (e.g. toluene, xylene, solvent naphtha 100, 150, 200 and the like); alcohols (e.g. ethanol, n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol); glycol ethers (e.g. ethylene glycol monomethyl ether, ethylene glycol monoethyl ether, ethylene glycol monobutyl ether, propylene glycol monomethyl ether, methoxypropanol and the like); glycol esters (e.g. butyl glycol acetate, methoxypropyl acetate and the like), and mixtures thereof.

Preferred organic solvents include aliphatic hydrocarbons, aromatic hydrocarbons, glycol esters, and mixtures thereof.

Particularly preferred organic solvents are water-miscible solvents, like methoxypropanol, methoxypropoxypropanol, or butylglycol.

The coating composition of the present invention preferably comprises a self-crosslinkable binder comprising:

one or more at least partially neutralized acid group(s) comprising unsaturated polyester(s) (SA1); or an at least partially neutralized acid groups comprising blend (SB1) obtained from blend (B1) comprising one or more unsaturated polyester(s) (A1) and one or more saturated polyester(s) (A3); or an at least partially neutralized acid groups comprising blend (SB2) obtained from blend (B2) comprising one or more unsaturated polyester(s) (A2) and one or more acid functional vinyl copolymer(s) (C), or an at least partially neutralized acid groups comprising blend (SB2) obtained from blend (B2) comprising one or more unsaturated polyester(s) (A2), one or more saturated polyesters (A3) and one or more acid functional vinyl copolymer(s) (C).

Preferably the one or more acid functional vinyl copolymer(s) (C) is (are) the polymerization product of alpha, beta ethylenically unsaturated monomers selected from the group consisting of (meth)acrylic acid, alkylesters of (meth)acrylic acid, ethylenically unsaturated diacids, mono- and dialkyl esters of ethylenically unsaturated diacids, vinyl monomers, allyl monomers, and combinations thereof.

Typical alkylesters of (meth)acrylic acid include methyl (meth)acrylate, ethyl (meth)acrylate, n-butyl (meth)acrylate, iso-butyl (meth)acrylate, tertiary butyl (meth)acrylate, 2-ethylhexyl (meth)acrylate, n-octyl (meth)acrylate, iso-octyl (meth)acrylate, nonyl (meth)acrylate, isodecyl (meth) acrylate, lauryl (meth)acrylate, stearyl (meth)acrylate, cyclohexyl (meth)acrylate, and isobornyl (meth)acrylate.

Typical vinyl polymers include vinyl alkanoates and aromatic vinyl monomers.

Typical vinylalkanoates include vinyl acetate, vinyl propionate, vinyl butyrate, vinyl 2-ethylhexoate, and vinyl neodecanoate (VEOVA® 10 available from Hexion).

Typical vinyl aromatic monomers include styrene; alpha-methyl styrene; isopropyl styrene; ortho-methyl-para-isopropyl styrene; para-tertiary-butyl styrene; vinyl toluene; ortho-, meta-, and para-methyl styrene; ortho-, para-dimethyl styrene; ortho-, meta-, and para-ethyl styrene; ortho-, para-diethyl styrene; para-chlorostyrene; and ortho-, para-dichlorostyrene.

Typical allyl monomers include, for example, allyl alcohol, methallyl alcohol, allyl acetate, allyl butyrate, allyl benzoate, methyl allyl ether, propoxylated allyl alcohols and acetate esters of propoxylated allyl alcohols.

Typical monoalkyl esters of ethylenically unsaturated diacids include monomethyl maleate, monobutyl maleate, monoisooctyl maleate, monolauryl maleate, monomethyl fumarate, monoethyl fumarate, monoisopropyl fumarate, mono-isobutyl fumarate, mono-(-n-pentyl) fumarate, monohexyl fumarate, mono(2-ethylhexyl) fumarate, dodecyl fumarate, monomethyl itaconate, monoethyl itaconate, monopropyl itaconate, monobutyl itaconate, monobutyl mesaconate, and monobutyl citraconate.

Typical dialkyl esters of ethylenically unsaturated diacids include dimethyl maleate, dibutyl maleate, diisooctyl maleate, dilauryl maleate, diethyl fumarate, dimethyl fumarate, diethyl fumarate, diisopropyl fumarate, di-isobutyl fumarate, di-(-n-pentyl) fumarate, dihexyl fumarate, di(2-ethylhexyl) fumarate, dodecyl fumarate, dimethyl itaconate, diethyl itaconate, dipropyl itaconate, dibutyl itaconate, dibutyl mesaconate, and dibutyl citraconate.

Alternatively and preferred, where possible, the alpha, beta ethylenically unsaturated monomers are obtained from renewable feedstock (i.e. the monomers, such as for example acrylic acid, n-heptyl acrylate, isobornyl methacrylate, isobutyl acrylate, and/or mono- or dialkyl itaconate are obtained in part or fully from (bio-)renewable sources). The exact amounts of bio-based carbon in these monomers can be determined by the method described in ASTM D6866-20, wherein carbons resulting from contemporary biomass-based inputs are distinguished from those derived from fossil-based inputs, the bio-based carbon content being reported as the fraction of total organic carbon content (TOC). Other standardized methods to determine the fraction of renewable carbon are ISO 16620-2 and CEN 16640.

Another alternative method for reducing the carbon footprint of the present polymer hybrid dispersions is to use recycled monomers for the preparation thereof. Polymers, such as poly(methyl methacrylate) or poly(styrene), can be pyrolyzed at temperatures above their ceiling temperature. By distillation of the pyrolysis products, recycled monomers, such as methyl methacrylate or styrene, can be obtained which can then be further used in the polymerization for preparing the present acid functional vinyl copolymer(s).

In yet another alternative, the alpha, beta ethylenically unsaturated monomers are obtained from petrochemical feedstock and/or renewable feedstock, and/or are recycled monomers.

In the context of the present description, "bio-based carbon content" refers to bio-carbon content.

Preferably the acid functional vinyl copolymer (C) comprises

- from 5 to 60% by weight, more preferably from 10 to 55% by weight, most preferably from 15 to 50% by weight, of one or more ethylenically unsaturated mono- or dicarboxylic acid(s) selected from the group consisting of acrylic acid, methacrylic acid, maleic acid or its anhydride, fumaric acid, itaconic acid or its anhydride, mesaconic acid, citraconic acid or its anhydride, and mixtures thereof; and
- from 40 to 95% by weight, preferably from 45 to 90% by weight, more preferably from 50 to 85% by weight, of alpha, beta ethylenically unsaturated monomers selected from the group consisting of vinyl alkanoates, vinyl aromatic monomers, alkylesters of (meth)acrylic, monoalkyl esters of ethylenically unsaturated diacids, dialkyl esters of ethylenically unsaturated diacids, and mixtures thereof.

More preferably the acid functional vinyl copolymer (C) comprises

- from 5 to 60% by weight, more preferably from 10 to 55% by weight, most preferably from 15 to 50% by weight, of acrylic acid and/or methacrylic acid; and
- from 40 to 95% by weight, preferably from 45 to 90% by weight, more preferably from 50 to 85% by weight, of ethylenically unsaturated monomers selected from the group consisting of vinyl aromatic monomers, alkylesters of (meth)acrylic, and mixtures thereof.

The one or more acid functional vinyl copolymer(s) (C) is (are) characterized by

- an acid number comprised between 50 and 250 mg KOH/g, preferably between 70 and 220 mg KOH/g, more preferably between 100 and 200 mg KOH/g, based on the total solid content of the one or more acid functional vinyl copolymer(s) (C);
- a Weight Average Molecular Weight (Mw) of at least 5,000 g/mole, preferably comprised between 5,000 and 300,000 g/mole, more preferably between 10,000 and 250,000 g/mole, even more preferably between 15,000 and 200,000 g/mole, as measured by Gel Permeation Chromatography using tetrahydrofuran as solvent; and
- a glass transition temperature, as measured by Differential Scanning Calorimetry, according to DIN EN 61006, method A, of at least 30° C., preferably comprised between 3° and 100° C., preferably between 4° and 90° C., more preferably between 50 and 90° C.

The acid functional vinyl copolymer (C) may be prepared by solution polymerization. The solution polymerization method may comprise a plurality of monomers, which may be referred to as a solution polymerization reaction mixture.

The solution polymerization reaction mixture may further comprise one or more initiator(s). The initiator may be a free radical initiator. Suitable initiators include, but are not limited to, tertiary butyl perbenzoate; tertiary butyl peroxy 3,5,5 trimethylhexanoate; tertiary butyl peroxy 2-ethyl hexanoate; di tertiary butyl peroxide; tertiary butyl peracetate; tertiary butyl peroctoate; azo type initiators such as, for example, 2,2'-azobis(isobutyronitrile), 2,2'-azobis(2-methylbutyronitrile), 2,2'-azobis(2,4-dimethyl valeronitrile) and 2,2'-azobis(4-methoxy-2,4-dimethyl valeronitrile); persulphate initiators such as, for example, ammonium persulphate, sodium persulphate or potassium persulphate; and combinations thereof.

Preferably the initiator comprises tertiary butyl peroctoate, tertiary butyl perbenzoate, or combinations thereof.

The solution polymerization reaction mixture may comprise a solvent or a mixture of solvents. Examples of suitable solvents include, but are not limited to, alcohols such as for example, n-butanol, pentanol or hexanol; glycols such as for example, butyl glycol; glycol ethers such as for example, 2-butoxy ethanol, 1-methoxy propan-2-ol, or dipropylene glycol mono methyl ether; aromatic hydrocarbons such as for example xylene, and combinations thereof. The solvent may comprise a mixture of solvents. The solvent or mixture of solvents is typically chosen such that the monomer mixture is substantially soluble in said solvent or mixture of solvents.

The solution polymerization is typically carried out as a free radical initiated solution polymerization in a solvent or mixture of solvents.

Solution polymerization is typically carried out in a suitable reaction vessel. The solution polymerization reaction mixture, initiator or mixture of initiators and/or solvent or mixture of solvents may be added to the reaction vessel in any suitable order.

Solution polymerization may be carried out at any suitable temperature comprised between 8° and 200° C., preferably between 8° and 180° C., more preferably between 8° and 160° C., even more preferably between 8° and 150° C., or even most preferably between 8° and 140° C. Solution polymerization may be carried out at reflux.

Alternatively, the acid functional vinyl copolymer (C) may be prepared by emulsion polymerization. The emulsion polymerization method suitably comprises a plurality of monomers, which may be referred to as an emulsion polymerization reaction mixture.

The emulsion polymerization reaction mixture may further comprise one or more initiator(s). Suitable initiators are as described above in relation to solution polymerization.

The polymerization of the monomers of the emulsion polymerization reaction mixture is typically carried out as a free radical initiated emulsion polymerization in water.

The emulsion polymerization reaction mixture may comprise a surfactant.

The surfactant may be an anionic, or non-ionic type stabilizer. Suitable examples of anionic surfactants include, but are not limited to, alkyl sulphates such as, for example, sodium dodecyl sulphate or sodium polyoxyethylene alkyl ether sulphate; aryl sulphonates such as, for example, sodium dodecylbenzene sulphonate; sulphosuccinates such as, for example, sodium diisobutyl sulphosuccinate, sodium dioctyl sulphosuccinate, sodium dicyclohexyl sulphosuccinate; and combinations thereof. Suitable examples of non-ionic emulsifiers include, but are not limited to, fatty alcohol ethoxylates such as, for example polyethylene glycol monolauryl ether; fatty acid ethoxylates such as, for example, polyethylene glycol monostearate or polyethylene glycol monolaurate; polyether block polymers such as, for example, polyethylene glycol/polypropylene glycol block polymers also known as pluronics, typical commercial products of this type include TERGITOL™ XJ, XH or XD commercially available from Dow Chemical; and combinations thereof.

The emulsion polymerization reaction mixture may be substantially free of surfactant. By substantially free of surfactants, it is meant in the present description that the emulsion polymerization reaction mixture comprises less than 5% by weight, preferably less than 1% by weight, more preferably less than 0.01% by weight, of surfactant based on the total weight of the emulsion polymerization reaction mixture. The emulsion polymerization reaction mixture may comprise no, i.e. 0% by weight, surfactant.

Emulsion polymerization is typically carried out in a suitable reaction vessel. The emulsion polymerization monomer mixture, initiator(s) and/or water may be added to the reaction vessel in any suitable order.

Emulsion polymerization may be carried out at any suitable temperature comprised between 2° and 150° C., preferably between 4° and 120° C., more preferably between 5° and 100° C., even more preferably between 6° and 95° C., most preferably between 7° and 90° C., or even at 80° C. The temperature is typically held constant throughout the emulsion polymerization process.

The at least partially neutralized acid groups comprising blend (SB2) obtained from blend (B2) comprising one or more polyester(s) (A2) and one or more acid functional vinyl copolymer(s) (C), for being used in the coating composition of the present invention, may be obtained in different ways, starting from a solution or an emulsion polymerization process.

In a first embodiment, one or more unsaturated polyester(s) (A2), or a mixture comprising one or more unsaturated polyester(s) (A2) and one or more saturated polyester(s) (A3), is (are) added to the acid functional vinyl copolymer (C) at the end of the solution copolymerization process, whereupon a condensation reaction of part of the hydroxyl functional groups of the one or more unsaturated polyester(s) (A2), or of the mixture comprising one or more unsaturated polyester(s) (A2) and one or more saturated polyester(s) (A3), and part of the carboxylic acid groups of the acid functional vinyl copolymer (C) is carried out at a temperature comprised between 11° and 180° C., preferably between 12° and 170° C., more preferably between 13° and 160° C., most preferably between 14° and 150° C., while the one or more solvent(s) is (are) distilled off. The condensation product (B2) is subsequently at least partially neutralized with neutralizing agent, resulting in (SB2).

In a second embodiment, one or more unsaturated polyester(s) (A2), or a mixture comprising one or more unsaturated polyester(s) (A2) and one or more saturated polyester(s) (A3), is (are) added to the acid functional vinyl copolymer (C) at the end of the copolymerization resulting in a physical mixture of (A2) and (C), or in a physical mixture of (A2), (A3) and (C). The physical mixture (B2) subsequently is at least partially neutralized with neutralizing agent, resulting in (SB2).

In a third embodiment, one or more at least partially neutralized unsaturated polyester(s) (SA2), or a mixture comprising one or more partially neutralized unsaturated polyester(s) (A2) and one or more partially neutralized saturated polyester(s) (A3), in water, optionally comprising additional surfactant, is (are) added and mixed to one or more at least partially neutralized acid functional vinyl copolymer(s) (SC), in water, resulting in a water dispersed physical mixture (SB2) of at least partially neutralized (SA2) and (SC), or of at least partially neutralized (SA2), (SA3) and (SC).

Preferably (SB2) is prepared according to the first embodiment, i.e. by the condensation reaction of part of the hydroxyl functional groups of the one or more unsaturated polyester(s) (A2), or part of the hydroxyl groups of the mixture of one or more unsaturated polyester(s) (A2) and one or more saturated polyester(s) (A3), and part of the carboxylic acid groups of the acid functional vinyl copolymer (C), to form condensation product (B2) which is subsequently partially neutralized.

Non limiting examples of neutralizing agents for forming anionic salt groups include inorganic and organic bases such as an amine, sodium hydroxide, potassium hydroxide, lithium hydroxide, ammonia, and mixtures thereof. Preferably amines are used as neutralizing agents. Non limiting examples of suitable amines include trimethyl amine, dimethylethanol amine, methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof.

Preferably the neutralizing agent for forming the anionic salt group is dimethylethanol amine.

In the context of the present description, the wording "at least part of the acid groups is converted into anionic salt groups" refers to at least 30% by mole of the acid groups being neutralized by neutralizing agent and thereby converted in an anionic salt group. More particularly, by at least partially neutralized acid groups in the present invention is meant that at least 30% by mole of the acid groups are neutralized, and converted in an anionic salt group. Preferably between 40 and 100% by mole, more preferably between 50 and 80% by mole, most preferably between 50 and 70% by mole of the acid groups are neutralized, and converted in an anionic salt groups.

The coating composition of the present invention preferably comprises as self-crosslinkable binder:

- one or more at least partially neutralized water dispersible unsaturated polyester(s) (SA1); or
- an at least partially neutralized blend (SB1) obtained from blend (B1) comprising:
  - from 25 to 99% by weight of one or more unsaturated polyester(s) (A1), and
  - from 1 to 75% by weight of one or more saturated polyester(s) (A3),
- where the sum of the weight percentages of (A1) and (A3) equals to 100 wt %; or
- an at least partially neutralized water dispersible blend (SB2) obtained from blend (B2) comprising:
  - from 30 to 95% by weight, preferably from 50 to 95% by weight of one or more unsaturated polyester(s) (A2), or of a mixture comprising one or more unsaturated polyester(s) (A2) and one or more saturated polyester(s) (A3), and
  - from 5 to 70% by weight, preferably from 5 to 50% by weight of one or more acid functional vinyl copolymer(s) (C),
- where the sum of the weight percentages of (A2) and (C), or of (A2), (A3) and (C), equals to 100 wt %, and
- wherein the blend (B2) is a physical blend of (A2) and (C), or of (A2), (A3) and (C), and/or the (chemical) reaction product of (A2) and (C), or of (A2), (A3) and (C), preferably, the blend (B2) is the (chemical) reaction product of (A2) and (C), or of (A2), (A3) and (C).

The coating composition of the present invention is free of additional crosslinker(s), i.e. comprises zero percentage (0.0%) of additional crosslinker.

Preferably, the coating composition of the present invention comprises less than 10,000 ppm, more preferably less than 5,000 ppm, even more preferably less than 1,000 ppm, even more preferably less than 500 ppm, still even more preferably less than 100 ppm, or even less than 50 ppm, most preferably less than 20 ppm, of constituents selected from the group consisting of Bisphenol-A Non-Intent (BPA-NI), formaldehyde, and isocyanates, and mixtures thereof.

The coating composition may comprise one or more metal catalyst(s) selected from the group consisting of aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn) and zirconium (Zr), and (metal) salts or (metal) complexes thereof, preferably, iron or manganese (or (metal) salts or (metal) complexes thereof), preferably, suitable metal catalysts are titanium, iron, or manganese (or (metal) salts or (metal) complexes thereof), more preferably, iron or manganese (or (metal) salts or (metal) complexes thereof).

Most preferably, the one or more metal catalyst(s) comprises an iron complex or a manganese complex, e.g. iron (Ill) citrate, iron (II) gluconate, iron (II) lactate, manganese (II) gluconate, manganese (II) lactate, manganese (II) citrate, manganese (II) bisglycinate, preferably in the presence of a counterion, more preferably a monovalent counterion, e.g. ammonium iron (Ill) citrate. Even most preferably the metal catalyst is ammonium iron (Ill) citrate.

In the present description, the wording "metal catalyst" refers to "metal crosslinking catalyst" or "crosslinking catalyst".

If the metal catalyst is a (metal) salt, the wording "metal cation" refers to the metal cation onto which one or more counteranion(s) is (are) bound, the wording "anion" refers than to that (those) counterion(s).

In the context of the present description, the term "(metal) complex" refers to a complex consisting of a metal atom or metal cation at its centre with a number of (neutral) molecules or anions—called ligands—bound to it. The (metal) complex itself can be charged or can have no net electric charge. In case the (metal) complex is charged, it can be further neutralized by one or more counterions (resulting in a complex with no net electric charge, in other words, resulting in a metal complex in the form of a salt).

In other words, if the metal catalyst is a (metal) complex, the wording "metal cation" refers to the central metal cation, the wording "ligand" refers to the ion(s) or molecule(s) that bind(s) to the central metal cation to form the (metal) complex.

If used, the crosslinking catalyst is preferably present in an amount comprised between 0.01 and 3% by weight, more preferably in an amount comprised between 0.1 and 1.0% by weight, based on the weight of non-volatile material in the coating composition.

More preferably, if used, the crosslinking catalyst comprises a metal cation and the amount of metal cation based on the weight of non-volatile material in the coating composition is comprised between 0.01 and 0.50% by weight, even more preferably between 0.05 and 0.40% by weight, most preferably between 0.05 and 0.30% by weight.

Preferably, the metal cation comprised in the crosslinking catalyst (if used) is an iron or a manganese metal cation.

If the aqueous coating composition comprises a crosslinking catalyst, the total unsaturated equivalent weight (tUEW) based on the total weight of (A1), (A2), (A3) and (C) preferably is comprised between 300 and 6,000 g/equiv., more preferably between 300 and 4,000 g/equiv., even more preferably between 300 and 2,500 g/equiv., most preferably between 300 and 1,000 g/equiv.

Alternatively, in the coating composition of the present invention the addition of crosslinking catalysts is completely omitted (i.e. the coating composition of the present invention comprises zero percentage (0.0%) of crosslinking catalysts).

According to one embodiment, where the one or more unsaturated polyester(s) (A1) and/or (A2) comprise(s) alpha, beta ethylenically unsaturated ester moieties, preferably obtained from the esterification of maleic anhydride and/or fumaric acid, the quantity of metal catalyst is low, preferably less than 0.1% by weight, more preferably less than 0.001% by weight, based on the weight of non-volatile material in the coating composition. Most preferably no metal catalyst is added (i.e. the coating formulation of the present invention comprising 0.0% metal catalyst).

Furthermore, organometallic compounds, preferably metal complexes comprising one or more ligands, may be added to the coating composition (as adhesion promoter), in an amount of up to 1.5% by weight, preferably of up to 1.2% by weight, more preferably of up to 1.0% by weight, based on the weight of non-volatile material in the coating composition.

Suitable metal complexes (as adhesion promotor) preferably comprise titanium (cation) and/or zirconium (cation).

Examples of one or more ligands are, for example, a lactate, an oxalate, or a citrate ligand.

In an embodiment, the metal complex (as adhesion promotor) is in the form of a salt, such as an ammonium salt.

Preferably the organometallic compound comprises a titanium complex (as adhesion promotor) in the form of a salt, such as for example titanium(IV) bis(ammonium lactato)-dihydroxide or ammonium bis(oxalato)oxotitanate (IV).

Preferably the coating composition comprises at least 0.05% by weight, more preferably at least 0.1% by weight, of one or more organometallic compound(s) (or organometallic adhesion promoter(s)) based on the weight of nonvolatile material in the coating composition.

More preferably, the coating composition comprises between 0.05% and 1.5% by weight, even more preferably between 0.1% and 1.5% by weight, most preferably between 0.1% and 1.2% by weight, of one or more organometallic compound(s) (or organometallic adhesion promoter(s)), based on the weight of nonvolatile material in the coating composition.

Even more preferably, the coating composition comprises between 0.05% and 1.5% by weight, yet even more preferably between 0.1% and 1.5% by weight, most preferably between 0.1% and 1.2% by weight, of a metal complex (as organometallic adhesion promoter), based on the weight of nonvolatile material in the coating composition. Preferably, the metal complex is a titanium complex in the form of an ammonium salt, more preferably a titanium(IV) bis(ammonium lactato)-dihydroxide.

In a further preferred embodiment, the coating composition comprises between 0.05% and 1.5% by weight of a metal complex (as adhesion promotor) and a crosslinking catalyst, the crosslinking catalyst comprising a metal cation which is different from the metal cation comprised in the metal complex used as adhesion promotor. More preferably, the amount of metal cation comprised in the crosslinking catalyst is comprised between 0.01 and 0.50% by weight based on the weight of non-volatile material in the coating composition.

The inventors surprisingly have found that the addition of one or more metal complex(es) (as organometallic adhesion promoter), preferably one or more titanium complex(es), to the water based coating composition of the present invention, improves the solvent resistance and the metal adhesion of the coatings derived from said water based coating compositions.

According to another embodiment, where the one or more unsaturated polyester(s) (A1) and/or (A2) comprise(s) an isolated ethylenically unsaturated double bond, preferably obtained from the esterification of unsaturated diacids or the anhydride thereof, comprising an isolated ethylenically unsaturated double bond such as tetrahydrophthalic acid, nadic acid, or methylnadic acid, or the anhydride thereof, a metal catalyst is preferably present, more preferably iron or manganese (or (metal) salts or (metal) complexes thereof), in an amount of at least 0.01%, more preferably between 0.01 and 3% by weight, most preferably in an amount comprised between 0.1 and 1.0% by weight based on the weight of non-volatile material in the coating composition.

The coating composition further may comprise (organic) co-solvents selected from the group consisting of alcohols, ketones, esters, glycols, glycol ethers, and glycol esters, and mixtures thereof.

The composition further may comprise one or more additive(s) selected from the group consisting of carriers, additional polymers, emulsifiers, pigments, metal powders or paste, fillers, anti-migration aids, anti-microbials, extenders, lubricants, coalescents, wetting agents, biocides, plasticizers, crosslinking catalysts, antifoaming agents, colorants, waxes, anti-oxidants, anticorrosion agents, flow control agents, thixotropic agents, dispersants, adhesion promoters, UV stabilizers and scavenger agents.

The coating composition comprises between 30 and 60% by weight, preferably between 30 and 55% by weight, more preferably between 35 and 50% by weight, of non-volatile compounds (SA1), or (SB1), or (SB2), and between 40 and 70% by weight, preferably between 45 and 70% by weight, more preferably between 50 and 65% by weight, of water, optional co-solvents and optional additives (the sum of the weight percentages being 100 wt %).

The coating composition of the invention can be applied to a substrate using any suitable procedure such as spray coating, roll coating, coil coating, curtain coating, immersion coating, dip coating, and the like, as well as other types of premetered coating. In one embodiment, where the coating is used to coat metal sheets or coils, the coating can be applied by roll coating.

In the present invention, the term "can" refers to various kind of cans, such as two-part cans, three-part cans, or monoblock cans.

The coating composition of the present invention can be applied to a wide variety of substrates, selected from the group consisting of metal, glass, polymers (such as polyimide-amide, polyetherketone, polyethersulfone, polyphenylsulfone, or polybenzimidazole), composites, concrete, ceramics and engineered wood (such as medium density fiber board or high density fiber board, particle board or oriented strand board), provided said substrates resist to the stoving cycle conditions.

The coating composition of the present invention can be applied on at least one side of the substrate, preferably on two sides of the substrate.

Preferably, the substrate is a metal substrate, more preferably a tinplate, a tin-free steel or an aluminium substrate.

Preferably, the substrate is a metal substrate for cans.

Preferably, the coating composition is applied at such a wet film thickness of less than 60 μm, preferably of less than 50 μm, more preferably comprised between 20 and 50 μm, most preferably between 30 and 45 μm.

After a water/co-solvent flash-off time of about 5 minutes at room temperature, curing of the coating may be performed (in an air ventilated convection oven) at a (stoving) temperature of at most 230° C., preferably comprised between 150 to 230° C., more preferably between 16° and 220° C., even more preferably between 17° and 220° C., most preferably between 19° and 220° C., even most preferably at a (stoving) temperature of from 200 up to 220° C., for a period of at most 25 minutes, preferably of from 5 to 20 minutes, more preferably of from 8 to 18 minutes, most preferably of from 10 to 15 minutes, resulting in a dry film thickness comprised between 5 and 20 μm, preferably between 7 and 15 μm, more preferably between 8 and 12 μm.

Alternatively the coating may be cured by InfraRed irradiation, such as near, short or medium infrared, or by induction or by a combination thereof. In the embodiment where infrared or induction systems are used, the stoving cycle is within the range comprised between 2 and 160 seconds, depending on the heating system or the combination of heating systems.

Finding a suitable combination of stoving temperature and time for use in a method according to the invention is well within the practice of those skilled in the art. Furthermore, depending on the desired specific performance requirements of the coating and/or on economic considerations, a metal catalyst can be added to the coating composition in order to reduce the stoving temperature and/or stoving time, or in order to improve specific performance parameters at a given stoving temperature and/or stoving time.

The coating formulations according to the present invention preferably are used in coil coating applications comprising the steps of

- unwinding a coil of a metal substrate;
- applying the coating formulation of the present invention on at least one side of the unwound metal substrate, at an appropriate coating thickness;
- stoving the applied coating formulation by means of suitable heating systems to form the metal substrate coated with the cured coating layer; and
- rewinding the metal substrate to form a metal substrate coil comprising the cured coating layer.

Prior to the coating application, the metal substrate preferably is pre-treated and/or primered. In an embodiment, the coil of the metal substrate, as provided by the supplier, is pre-treated and/or primered.

The coating formulations according to the present invention preferably are used in (light) metal packaging, more particularly in can coating applications comprising the steps of:

- unwinding the coated metal substrate coil, coated with the cured coating formulation of the present invention;
- cutting a can body and can ends into the desired shape, in order to produce a three-piece can; or
- embossing a metal piece into a can body and cutting the can end into the desired shape in order to produce a two-piece can; and
- assembling the can body and the can end(s).

Preferably the exterior surface of the cans comprise one or more print(s).

Preferably the cans are intended for food and beverage applications.

When used in coil or can coating applications, the interior and/or the exterior of the coils or cans can be coated with the coating composition of the present invention.

Preferably the interior and the exterior of the coils or cans are coated with the coating composition of the present invention.

When using the coating compositions of the present invention, for coating metal substrates such as coils and cans, coatings are obtained having outstanding coating performances, more particularly having improved solvent resistance (compared to when using coating compositions already described in the prior art up to now), without losing their flexibility and substrate adhesion. Moreover, coating compositions of the present invention do not comprise an additional crosslinker and are BPA-NI (Bisphenol-A Non-Intent) and isocyanate and formaldehyde-free (i.e. are free of BPA-NI (Bisphenol-A Non-Intent), isocyanate and formaldehyde).

EXAMPLES

The following illustrative examples are merely meant to exemplify the present invention but are not intended to limit or otherwise define the scope of the present invention.

Example 1

Synthesis of an Anionic Salt Group(s) Comprising Unsaturated Polyester (SA1)

A two liter four necked glass flask, equipped with a mechanical stirrer, a thermo-sensor and a reflux cooler with water separator was charged with 227 g of a mixture of the isomeric compounds of 3,8-bis(hydroxymethyl)-tricyclo[5.2.1.0$^{2,6}$]decane, 4,8-bis(hydroxymethyl)-tricyclo[5.2.1.0$^{2,6}$]decane and 5,8-bis(hydroxymethyl)-tricyclo[5.2.1.0$^{2,6}$]decane (the mixture being referred to as TCD-diol), 109 g of 1,4-butanediol, 154 g of isophthalic acid, 38 g of trimethylolpropane, 29 g of trimellitic anhydride and 0.6 g of monobutyltin oxide under nitrogen purge. The mixture was heated under a continuous nitrogen flow, under stirring, within 120 minutes to 170° C. The temperature was kept at 170° C. for 30 minutes, whereby reaction water starts to distill off. The temperature was then increased to 200° C. at a heating rate of 10° C./h. The condensation reaction was run for 2 hours at 200° C. and 49 g of the forming reaction water was separated. The determined acid value at this stage was 23 mg KOH/g.

The reaction mixture was allowed to cool to 150° C. and 91 g of maleic anhydride and 0.6 g of butylhydroxytoluene were added under stirring. Then the temperature was increased to 165° C. at a heating rate of 10° C./h. The condensation was allowed to continue for about 4 hours until 68 g reaction water was collected and an acid value of 27 mg KOH/g was reached. Heating was switched off and 111 g of butylglycol was added under stirring. The mixture was allowed to homogenize for 15 min, followed by another portion of 80 g butylglycol. At the resulting temperature of 97° C., 12.8 g of dimethylethanolamine was added, together with 194 g of butylglycol. The resin solution was cooled to 60° C. and adjusted with another portion of butylglycol to a solids content of about 46.0%.

The obtained resin solution was characterized by

- a non-volatile matter of 46.1%;
- an acid value of 29 mg KOH/g;
- an unsaturated equivalent weight (UEW) of 647 g/equiv.;
- a dynamic viscosity of 5.557 mPa·s;
- an intrinsic viscosity of 28.8 ml/g;
- a number average and a weight average molecular weight of, respectively, 2,966 g/mole and 155,600 g/mole;
- a glass transition temperature of 55° C.

Example 2

Synthesis of an Anionic Salt Group(s) Comprising Unsaturated Polyester (SA1)

167 g of 1,4-cyclohexanedimethanol, 109 g of 1,4-butanediol, 38 g of trimethylolpropane, 154 g of isophthalic acid and 29 g of trimellitic anhydride, 91 g of maleic anhydride and 19.3 g of dimethylethanolamine were reacted as in Example 1.

The obtained resin solution was characterized by

- a non-volatile matter of 57.0%;
- an acid value of 36 mg KOH/g;
- an unsaturated equivalent weight (UEW) of 582 g/equiv.;
- a dynamic viscosity of 17,930 mPa·s;
- an intrinsic viscosity of 24.0 ml/g;
- a number average and a weight average molecular weight of, respectively, 3,224 g/mole and 86,260 g/mole;
- a glass transition temperature of 50° C.

Example 3

Synthesis of the Reaction Product (or Chemical Hybrid) (SB2) of an Unsaturated Polyester (A2), a Saturated Polyester (A3) and an Acid Functional Vinyl Copolymer (C).

Step 1—Unsaturated Polyester A2:

A 1 liter four necked glass flask, equipped with a mechanical stirrer, a thermo-sensor and a reflux cooler with water separator, was charged with 353 g of TCD-diol, 27 g of 1,4-butanediol, 232 g of terephthalic acid, 60 g of xylene and 0.6 g of monobutyltin oxide under nitrogen purge. The mixture was heated under a continuous nitrogen flow, under stirring, within 90 minutes to 160° C. Temperature was kept at 160° C. for 30 minutes. The temperature was then increased to 240° C. at a heating rate of 10° C./h. Reflux distillation was set up by tuning the amount of xylene, while reaction water continued to separate. Reflux distillation was allowed to continue until an acid value of less than 4 mg KOH/g was obtained (5 hours, collected reaction water 50.4 g). The reaction mixture was then cooled to 120° C., 59 g of maleic anhydride and 0.7 g of butylhydroxytoluene were added under stirring. The temperature was increased to 160° C. and reflux distillation was set up again by the adjustment of the amount of xylene. Reflux distillation was allowed to continue until an acid value of 8 mg KOH/g was obtained (10 hours, collected reaction water 10.5 g). The reaction mixture was cooled to 145° C. and diluted with 100 g of methoxypropoxypropanol in small portions under good stirring. Stirring was continued for 30 minutes at 110° C. and solids content was adjusted with methoxypropoxypropanol to 75%.

Intermediate Values:

- non-volatile matter: 75.0%;
- intrinsic viscosity: 12.9 ml/g;
- acid value: 9.0 mg KOH/g (on solids);
- an unsaturated equivalent weight (UEW) of 1019 g/equiv.;
- number average molecular weight Mn of 3,972 g/mole and weight average molecular weight Mw of 14,080 g/mole; and
- glass transition temperature Tg: 101° C.

Step 2—Hybrid Formation with an Acid Functional Vinyl Copolymer (C):

A dropping funnel 1 was charged with a premix of 94 g of styrene, 37 g of butylacrylate and 29 g acrylic acid. A dropping funnel 2 was charged with a mixture of 16 g of xylene and 4.8 g of tert.-butyl peroctoate.

The contents of dropping funnels 1 and 2 were then added simultaneously within 6 hours at 80° C. under stirring to a 2 liter four necked glass flask, equipped with a mechanical stirrer, a thermo-sensor and a reflux cooler, charged with a mixture of 63 g of the acid group comprising saturated polyester (A3) (from Example 5 below, but not neutralized with dimethylethanolamine), 67 g of xylene and 28 g of methoxypropoxypropanol, pre-heated to 80° C. At the end of the monomer feed, an additional amount of 0.48 g of tert.-butyl peroctoate was added and the reaction mixture was stirred for a another 2 hours at 82° C.

149 g of the material from step 1 (unsaturated polyester (A2)) were added to the reaction mixture and temperature was increased to 145° C. within 4 hours, while solvent was allowed to distill off, with the aid of reduced pressure at the end of this step (target solids content 85%). The temperature was further kept at 145° C. until the desired acid number has dropped to 65 mg KOH/g (5 hours). The temperature was then reduced to 95° C., 27 g of dimethylethanolamine were added and allowed to homogenize for 30 minutes. The reaction mixture was diluted with 440 g of water, homogenized for 1 hour and residual xylene distilled off as an azeotropic mixture with water. Finally, the dispersion was adjusted to 35% solids with water.

The obtained dispersion was characterized by

- a non-volatile matter of 34.7%
- an acid value of 65 mg KOH/g;
- a total unsaturated equivalent weight (tUEW) of 3115 g/equiv.;
- a dynamic viscosity of 1160 mPa·s;
- a number average and a weight average molecular weight of, respectively, 1,750 g/mole and 29,530 g/mole; and
- a glass transition temperature of 56° C.

Example 4

Synthesis of the Reaction Product (or Chemical Hybrid) (SB2) of an Unsaturated Polyester (A2), a Saturated Polyester (A3) and an Acid Functional Vinyl Copolymer (C).

In this Example 4, a polyester-hybrid is prepared in a similar way as in Example 3, but now with a lower unsaturated equivalent weight.

Step 1:

353 g of TCD-diol, 27 g of 1,4-butanediol, 166 g of terephthalic acid and 98 g of maleic anhydride were reacted as under Step 1 of Example 3.

Intermediate Values:

- non-volatile matter: 75.0%;
- intrinsic viscosity: 17.9 ml/g;
- acid value: 9.6 mg KOH/g;
- an unsaturated equivalent weight (UEW) of 593 g/equiv.;
- number average molecular weight Mn of 5,622 g/mole and weight average molecular weight Mw of 20,160 g/mole; and
- glass transition temperature Tg: 97° C.

Step 2: Hybrid Formation with an Acid Functional Vinyl Copolymer (C)

94 g of styrene, 37 g of butylacrylate and 29 g acrylic acid, and 63 g of the acid group comprising saturated polyester (A3) (from Example 5 below, but not neutralized with dimethylethanolamine), followed by the condensation with 149 g of the material from step 1 (unsaturated polyester (A2)) were reacted as in Step 2 of Example 3 and 27 g of dimethylethanolamine were added as neutralizing agent.

The obtained dispersion was characterized by

- a non-volatile matter of 35,5%;
- an acid value of 64 mg KOH/g;
- a total unsaturated equivalent weight (tUEW) of 1800 g/equiv;
- a dynamic viscosity of 1330 mPa·s;
- a number average and a weight average molecular weight of 1,320 g/mole and 26,850 g/mole, respectively;
- a glass transition temperature of 52° C.

Example 5: Synthesis of Saturated Polyester (A3)

A two liter four necked glass flask, equipped with a mechanical stirrer, a thermo-sensor and a reflux cooler with water separator was charged with 194 g of a mixture of the isomeric compounds of 3,8-bis(hydroxymethyl)-tricyclo[$5.2.1.0^{2,6}$]decane, 4,8-bis(hydroxymethyl)-tricyclo[$5.2.1.0^{2,6}$]decane and 5,8-bis(hydroxymethyl)-tricyclo[$5.2.1.0^{2,6}$]decane (TCD-diol), 93 g of 1,4-butanediol, 132 g of isophthalic acid, 33 g of trimethylolpropane, 44 g of trimellitic anhydride, 115 g of adipic acid and 0.6 g of monobutyltin oxide under nitrogen purge. The mixture was heated, while stirring, under a continuous nitrogen flow within 90 minutes to 140° C. The temperature was kept at 140° C. for 30 minutes, whereby reaction water starts to distill off. The temperature was then increased to 200° C. at a heating rate of 10° C./h. The condensation reaction was run for about 5 hours at 200° C. where about 65 g of reaction water was separated and an acid value of 20 mg KOH/g was measured.

The heating was switched off and the resin was allowed to cool to 145° C. before 95 g of butylglycol was added under stirring. The mixture was allowed to homogenize for 15 minutes, followed by the addition of another portion of 68 g butylglycol. At a temperature of 95° C., 8.9 g of dimethylethanolamine was added, together with 178 g of butylglycol. The resin solution was cooled to 60° C. and adjusted with butylglycol to a solids content of 60%.

Final Values:

- non-volatile matter of 59.9%,
- dynamic viscosity of 15 455 mPa·s (23° C., SR 10 1/s),
- acid value of 20.0 mg KOH/g (on solids),
- intrinsic viscosity of 28.7 ml/g,
- number average molecular weight Mn of 3,276 g/mole and weight average molecular weight Mw of 119,800 g/mole,
- glass transition temperature Tg of 22° C.

Example 6

Synthesis of the Reaction Product (or Chemical Hybrid) (SB2) of an Unsaturated Polyester (A2), a Saturated Polyester (A3) and an Acid Functional Vinyl Copolymer (C).

In this Example 6, a polyester-hybrid is prepared in a similar way as in Example 3, but now with an even lower unsaturated equivalent weight.

Step 1:

353 g of TCD-diol, 27 g of 1,4-butanediol, 58 g of terephthalic acid and 157 g of maleic anhydride were reacted as under Step 1 of Example 3.

Intermediate Values:

- non-volatile matter: 75.0%;
- intrinsic viscosity: 22.5 ml/g;
- acid value: 11.6 mg KOH/g;
- an unsaturated equivalent weight (UEW) of 348 g/equiv.;
- number average molecular weight Mn of 6,336 g/mole and weight average molecular weight Mw of 18,370 g/mole; and
- glass transition temperature Tg: 55° C.

Step 2: Hybrid Formation with an Acid Functional Vinyl Copolymer (C)

38 g of styrene, 2.3 g of butylacrylate and 17 g acrylic acid, and 29 g of the acid group comprising saturated polyester (A3) (from Example 5 above, but not neutralized with dimethylethanolamine), followed by the condensation with 149 g of the material from step 1 (unsaturated polyester (A2)) were reacted similar to Step 2 of Example 3 with the difference that the contents of dropping funnels 1 and 2 were added simultaneously within 6 hours at 100° C., at the end of the monomer feed, an additional amount of 0.48 g of tert.-butyl peroctoate was added and the reaction mixture was stirred for another 2 hours at 120° C. and 18 g of dimethylethanolamine were added as neutralizing agent.

The obtained dispersion was characterized by

- a non-volatile matter of 46.2%;
- an acid value of 64 mg KOH/g;
- a total unsaturated equivalent weight (tUEW) of 578 g/equiv;
- a dynamic viscosity of 452 mPa·s;
- a number average and a weight average molecular weight of 5,844 g/mole and 22,900 g/mole, respectively;
- a glass transition temperature of 33° C.

Example 7

Synthesis of the Reaction Product (or Chemical Hybrid) (SB2) of an Unsaturated Polyester (A2), a Saturated Polyester (A3) and an Acid Functional Vinyl Copolymer (C).

In this Example 7, a polyester-hybrid is prepared in a similar way as in Example 3, but now with an even lower unsaturated equivalent weight.

Step 1:

353 g of TCD-diol, 27 g of 1,4-butanediol, 58 g of terephthalic acid and 157 g of maleic anhydride were reacted as under Step 1 of Example 3.

Intermediate Values:

- non-volatile matter: 75.0%;
- intrinsic viscosity: 22.5 ml/g;
- acid value: 11.6 mg KOH/g;
- an unsaturated equivalent weight (UEW) of 348 g/equiv.;
- number average molecular weight Mn of 6,336 g/mole and weight average molecular weight Mw of 18,370 g/mole; and
- glass transition temperature Tg: 55° C.

Step 2: Hybrid Formation with an Acid Functional Vinyl Copolymer (C)

38 g of styrene, 2.3 g of butylacrylate and 17 g acrylic acid, and 9.5 g of the acid group comprising saturated polyester (A3) (from Example 5 above, but not neutralized with dimethylethanolamine), followed by the condensation with 196 g of the material from step 1 (unsaturated polyester (A2)) were reacted as in Step 2 of Example 6 and 18 g of dimethylethanolamine were added as neutralizing agent.

The obtained dispersion was characterized by

- a non-volatile matter of 44.1%;
- an acid value of 61 mg KOH/g;
- a total unsaturated equivalent weight (tUEW) of 497 g/equiv;
- a dynamic viscosity of 500 mPa·s;
- a number average and a weight average molecular weight of 4,533 g/mole and 19,210 g/mole, respectively;
- a glass transition temperature of 26° C.

Resin Characteristics

For Examples 1 to 7, resin characterization is done according to:

- non-volatile matter, according to DIN 55671 (foil method), 180° C., 10 min.;
- an acid value, measured on the non-volatile matter, according to DIN EN IOS2114;
- unsaturated equivalent weight (only for the example 1 to 4, 6 and 7), estimated on the non-volatile matter, wherein the unsaturated equivalent weight (UEW) is calculated by dividing the weight of the unsaturated polyester (A1) and (A2) by the number of moles of ethylenically unsaturated diacids present in the initial reaction mixture, and wherein the total unsaturated equivalent weight (tUEW) is calculated by dividing the total weight of (A1), (A2), (A3) and (C) by the number of moles of ethylenically unsaturated diacids present in the initial reaction mixture, the weight of the polyester (A1), (A2) and (A3), respectively, being the sum of the weight of polyols, polyacids and ethylenically unsaturated diacids, minus the weight of the water formed during the respective polycondensation;
- dynamic viscosity, according to DIN EN ISO 3219, at 23° C. and a shear rate of 10.1/s (Anton Paar, Physica MCR1);
- intrinsic viscosity, in chloroform, according to DIN 51562 T1;
- number average and weight average molecular weight, measured by Gel Permeation Chromatography, in tetrahydrofuran;
- glass transition temperature, measured by Differential Scanning Calorimetry, according to DIN EN 61006 (method A).

Example 8: Coating Composition

Coating compositions were prepared from (SA1) and (SB2) of the Examples 1 to 5, respectively, by diluting with water under stirring to a mass fraction 40%. Then 0.3% of ADDITOL® XW 6580 (flow and substrate wetting agent, from Allnex) was added and homogenized well for some minutes. Coating compositions comprising the anionic salt comprising resins of Examples 1 to 4 are according to the invention. Comparative Example 1 illustrates a coating composition comprising only the anionic salt comprising saturated polyester of Example 5.

Example 9: Coating Application and Test Methods

The coating compositions were bar-drawn on a metal panel at a wet film thickness of 40 μm. After a flash-off time of 5 minutes, coated panels were oven dried at 200° C. and 220° C., respectively, for 12 min, resulting in dry film thicknesses of 10+/−2 μm.

Metal Substrate: tin-plated steel, 320×125×0.25 mm

Oven: Mathis Lab-dryer, Type LTH 113817

Tests: Coating Evaluation is Based on the Following Tests

- Cross Cut Test, according to DIN EN ISO 2409, is used to test the adhesion of dry coats on their substrate by means of a series of cuts through the coating. Two series of parallel cuts cross angled to each other to obtain a pattern of 25 or 100 similar squares. The ruled area is evaluated by using a table chart after a short treatment with a stiff brush, or adhesive tape for hard substrates. Classification is from 0 to 5 wherein 0 corresponds to a situation wherein the edges of the cuts are completely smooth and wherein none of the squares of the lattice is detached.
- Surface, flow, levelling and defects of the coating is visually evaluated and graded in five scales from the best (0) to the worst (5).
- The extent of "cure" or crosslinking is measured as a resistance to acetone. This test is performed as described in ASTM D5402. The number of double-rubs (i.e., the number of back-and-forth motions till the metal substrate becomes visible) is reported. Preferably, the acetone solvent resistance is at least 30 double rubs.
- Impact test is measured according to ASTM 2794; coatings are evaluated at an impact of 32 inch-pound. Damage to the coating may be determined visually or with low power magnification. The organic coating under test is applied to four or more suitable thin metal panels. After the coatings have cured are stored for 1 hour at 20° C.; subsequently a standard weight is dropped from a standard height to deform the coating and the substrate. The indentation is an intrusion (direct impact; on coating side) or an extrusion (reverse impact; on metal side).
- Wedge bend test is performed according to ASTM D3281 using an Erichsen Folded-Impact testing device, Type 471; cone bolt 5 mm diameter. Test wedges are formed from coated rectangular metal test sheets (which measured 10 cm length by 2 cm width). Test wedges are formed from the coated sheets by folding (i.e., bending) the sheets around a 5 mm diameter mandrel. To accomplish this, the mandrel is positioned on the coated sheets so that it is oriented parallel to, and equidistant from, the length edges of the sheets. The resulting test wedges have a 5 mm wedge diameter and a length of 100 mm. To assess the wedge bend properties of the coatings, the test wedges are positioned lengthwise in a metal block of a wedge bend tester and a 1,800+/−g weight is dropped onto the test wedges from a height of 50 cm. The deformed test wedges are then immersed in a an acid copper sulphate test solution for 5 minutes. The solution is prepared by dissolving 132 g of $CuSO_4 \cdot 5H_2O$ in 900 g of water containing 20 g of concentrated hydrochloric acid. The panels are withdrawn from the solution, rinsed with tap water, wiped dry, examined under a microscope and the millimeters of coating failure along the deformation axis of the test wedges measured. The data are expressed as a wedge bend percentage using the following calculation: 100%×[(wedge length 100 mm)−(mm of failure)]/(wedge length 100 mm). The coating is considered to satisfy the Wedge Bend Test if it exhibits a wedge bend percentage of 70% or more.

Example 10: Coating Evaluation

In Table 1, the coating performances of the coatings based on Example 1 to 4 are reported along with the coating performances of Comparative Example 1, being a coating composition only based on the water dispersed saturated polyester (A3) of Example 5 and along with a comparative, state of the art commercial coating composition (Comparative Example 2) based on 31.3 parts of DUROFTAL® PE 6607/60BGMP (Allnex); 0.75 parts of dimethylethanolamine; 7.8 parts of PHENODUR® PR612/80B (Allnex); 0.15 parts of ADDITOL® XW 6580 (Allnex) and 60 parts of water/co-solvent for obtaining a final solid content of 40%. DUROFTAL® PE 6607/60BGMP is an oil-free polyester resin especially developed as a replacement of epoxy resins for interior and exterior coatings for can coating. Results for panels coated with coating compositions and dried at 200° C. versus those dried at 220° C. are denoted with "/".

TABLE 1

| | Ex. 1 | Ex. 2 | Ex. 3 | Ex.4 | Comp. Ex. 1 | Comp. Ex. 2 |
|---|---|---|---|---|---|---|
| Stoving Conditions (12 min at 200/220° C.) | 200/220 | 200/220 | 200/220 | 200/220 | 200/220 | 200 |
| Surface Appearance | 0/0 | 0/0 | 0/0 | 0/0 | 0/0 Sticky | 0 |
| Crosscut | 0/0 | 0/0 | 0/0 | 0/0 | 0/0 | 0 |
| Acetone double rubs | 62/122 | 65/165 | 35/50 | 55/70 | <5/<5 | 65 |
| Impact (Direct/reverse) | ok/ok | ok/ok | ok/ok | ok/ok | fail/fail | ok |
| Wedge Bending Test | 88/78 | 82/75 | 78/88 | 72/80 | 96/100 | 70 |

From Table 1 it is clear that the coating compositions according to the present invention result in coatings with improved solvent resistance when compared to using current state of the art commercial resins (which contain a cross-linker), while substrate adhesion (cross-cut) and flexibility (impact and wedge bend test) are still maintained.

Example 11: Coating Composition and Evaluation

Coating compositions were prepared from the resin solution of (SA1) of Example 1 and the dispersions of (SB2) of Examples 6 and 7, respectively. The components were weighed in and mixed according to Table 2 and well homogenized for some minutes. The coating compositions were then bar-drawn on a metal panel at a wet film thickness of 40 μm. After a flash-off time of 5 minutes, coated panels were oven dried at 200° C. for 12 min, resulting in dry film thicknesses of 8+/−2 μm.

Metal Substrate: tin-plated steel, 320×125×0.25 mm

Oven: Mathis Lab-dryer, Type LTH 113817

TABLE 2

| | % solids | Coating 1 | Coating 2 | Coating 3 | Coating 4 | Coating 5 |
|---|---|---|---|---|---|---|
| Product of Example 1 | 46.1% | 10.8 g | — | — | — | — |
| Product of Example 6 | 46.2% | — | 21.6 g | 21.6 g | — | — |
| Product of Example 7 | 44.1% | — | — | — | 30.0 g | 30.0 g |
| Additol XW 6580 | | 0.02 g | 0.06 g | 0.06 g | 0.08 g | 0.08 g |
| Water deionized | | 2.40 g | 5.00 g | 5.00 g | 3.88 g | 3.88 g |
| Ammonium Iron (III) citrate (50% in water) | | 0.07 g | 0.06 g | 0.13 g | 0.26 g | 0.26 g |
| Titanium (IV)bis(ammonium lactato)-dihydroxide (50 wt % in water) | | — | — | — | — | 0.26 g |
| % iron cation based on nonvolatile material | | 0.15 | 0.06 | 0.14 | 0.21 | 0.21 |
| % titanium complex based on nonvolatile material | | — | — | — | — | 0.98 |
| Surface appearance | | 0 | 0 | 0 | 0 | 0 |
| Crosscut | | 0 | 0 | 0 | 0 | 0 |
| Acetone double-rubs | | 140 | 30 | 84 | 90 | 120 |

Comparing the coating performance of the coating based on Example 1 on panels cured at 200° C. in Table 1 with those for Coating 1 in Table 2 (at 200° C. as well), it can be observed that the addition of a metal catalyst (ammonium iron (Ill) citrate) significantly improves the acetone solvent resistance. An improvement of the acetone solvent resistance can also be seen comparing these results of the coating based on Example 1 obtained with higher stoving temperature (220° C.) in Table 1 with those obtained at lower stoving temperature (200° C.) in Table 2. This shows that addition of a metal catalyst allows to work at lower stoving temperatures, obtaining higher solvent resistance to acetone while substrate adhesion (cross-cut) is still maintained.

Comparing the results in Table 2 for coating 2 with those for coating 3, now both based on Example 6, shows that increasing the amount of metal catalyst used can further improve the acetone solvent resistance (substrate adhesion being maintained as well).

Furthermore, from Table 2 it can be observed that particularly when working at lower stoving temperature (200° C.) the addition of a metal catalyst (ammonium iron (Ill) citrate) in combination with a metal complex as adhesion promotor (titanium(IV)bis(ammoniumlactato)-dihydroxide) further improves the acetone solvent resistance, while substrate adhesion (cross-cut) is still maintained (comparing results for coating 4 with those for coating 5, both based on Example 7).

The invention claimed is:

1. An aqueous coating composition comprising:

one or more anionic salt group(s) comprising one or more unsaturated polyester(s) (SA1), said one or more anionic salt group(s) comprising the one or more unsaturated polyester(s) (SA1) being the reaction product of one or more acid groups comprising the one or more unsaturated polyester(s) (A1) and neutralizing agent, wherein at least part of the acid groups of the one or more unsaturated polyester(s) (A1) is converted into an anionic salt group and/or wherein up to 75% by weight of the one or more acid groups comprising unsaturated polyester(s) (A1) is replaced by one or more acid groups comprising saturated polyester(s) (A3), forming polyester blend (B1);

said one or more acid groups comprising the one or more unsaturated polyester(s) (A1) being the reaction product of polyacids and a stoichiometric excess of polyols, wherein the ratio of hydroxyl equivalents over acid equivalents (mol/mol) is comprised between 1.05 and 1.6;

the hydroxyl groups of said polyols are connected by a linear, branched, or cyclic hydrocarbon moiety;

at least 30 mole percentage of said polyols are cyclic polyols;

at least one of said polyols comprises three or more hydroxyl groups and at least one of the polyacids comprises three or more acid groups; and said one or more acid groups comprising polyester(s) (A1) is (are) characterized by an acid number of at least 25 mg KOH/g, based on the total solid content of the one or more polyester(s) (A1), said one or more saturated polyester(s) (A3), if present, being the reaction product of polyacids and a stoichiometric excess of polyols, and said one or more saturated polyester(s) (A3) being characterized by:

a glass transition temperature, as measured by Differential Scanning calorimetry according to DIN EN 61006, method A, of at least 10° C.; and a dynamic viscosity, according to DIN EN ISO 3219 ($10\ s^{-1}$ at 23° C.), at a non-volatile matter of 60±0.5% measured according to DIN 55671, 180° C., 10 min., comprised between 5,000 and 25,000 mPa·s, and wherein the total unsaturated equivalent weight (tUEW) based on the total weight of (A1) and, if present, (A3) is comprised between 300 and 6,000 g/equiv.

2. The aqueous coating composition according to claim 1, wherein the one or more unsaturated polyesters (A1) are characterized by:

a weight average molecular weight (Mw), as measured by Gel Permeation Chromatography using tetrahydrofuran as solvent, of more than 5,000 g/mole, a glass transition temperature, as measured by Differential Scanning calorimetry according to DIN EN 61006, method A of at least 40° C.

3. The aqueous coating composition according to claim 1, wherein the polyacids of the one or more unsaturated polyester(s) (A1) comprise at least 5 mole percentage of ethylenically unsaturated diacids or their anhydride, being selected from the group consisting of alpha, beta ethylenically unsaturated dicarboxylic acids; alpha, beta ethylenically unsaturated acid anhydrides, unsaturated diacids comprising an isolated ethylenically unsaturated double bond; unsaturated acid anhydrides comprising an isolated ethylenically unsaturated double bond, and mixtures thereof.

4. The aqueous coating composition according to claim 3, wherein the ethylenically unsaturated diacids or their anhydride are selected from the group consisting of alpha, beta ethylenically unsaturated diacids, alpha, beta ethylenically unsaturated acid anhydrides, and mixtures thereof.

5. The aqueous coating composition according to claim 1, wherein the polyacids of the one or more unsaturated polyester(s) (A1) comprise between 30 and 85 mole percentage of aromatic dicarboxylic acids and/or corresponding anhydrides being selected from the group consisting of orthophthalic acid, isophthalic acid, terephthalic acid, and mixtures thereof.

6. The aqueous coating composition according to claim 1, wherein the cyclic polyols of the one or more unsaturated polyester(s) (A1) comprise five-membered and/or six-membered cyclic diols selected from the group consisting of monocyclic diols, polycyclic diols, and mixtures thereof.

7. The aqueous coating composition according to claim 6, wherein the cyclic diols of the one or more unsaturated polyesters (A1) comprise cyclic diols selected from the group consisting of 1,4-cyclohexanediol, 1,4-cyclohexanedimethanol, 1,3-cyclohexanedimethanol, 3,8-bis(hydroxymethyl)-tricyclo[5.2.1.02,6]decane, 4,8-bis(hydroxymethyl)-tricyclo[5.2.1.$0^{2,6}$]decane, 5,8-bis(hydroxymethyl)-tricyclo[5.2.1.$0^{2,6}$]decane, and mixtures thereof.

8. The aqueous coating composition according to claim 1, wherein the polyols of the one or more polyester(s) (A1) comprise(s):

one or more linear or branched aliphatic diol(s); and/or cyclic diols selected from the group consisting of 1,4-cyclohexanediol, 1,4-cyclohexanedimethanol, 1,3-cyclohexanedimethanol, 3,8-bis(hydroxymethyl)-tricyclo[5.2.1.$0^{2,6}$]decane, 4,8-bis(hydroxymethyl)-tricyclo[5.2.1.$0^{2,6}$]decane, and 5,8-bis(hydroxymethyl)-tricyclo[5.2.1.02,6]decane, and mixtures thereof.

9. The aqueous coating composition according to claim 1 comprising an anionic salt groups comprising polyester blend (SB1), said blend (SB1) being the reaction product of an acid groups comprising polyester blend (B1), of polyesters (A1) and (A3), and neutralizing agent, wherein at least part of the acid groups is converted into anionic salt groups, said polyester blend (B1) of (A1) and (A3) comprising between 25 and 99% by weight of one or more acid groups comprising unsaturated polyester(s) (A1); and between 1 and 75% by weight of one or more acid groups comprising saturated polyester(s) (A3);

based on the total weight of (A1) and (A3), and where the sum of the weight percentages of (A1) and (A3) equals to 100 wt %.

10. The aqueous coating composition according to claim 1, wherein the neutralizing agent is a tertiary amine selected from the group consisting of trimethyl amine, dimethylethanol amine, methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof.

11. The aqueous coating composition according to claim 1 comprising from 30 to 60% by weight of:

one or more anionic salt group(s) comprising unsaturated polyester(s) (SA1); or an anionic salt groups comprising blend (SB1) of one or more unsaturated polyester(s) (A1) and one or more saturated polyester(s) (A3).

12. The aqueous coating composition according to claim 1, comprising one or more organic solvent(s) and one or more additive(s) selected from the group consisting of carriers, additional polymers, emulsifiers, pigments, metal powders or paste, fillers, anti-migration aids, anti-microbials, extenders, lubricants, coalescents, wetting agents, biocides, plasticizers, crosslinking catalysts, antifoaming agents, colorants, waxes, anti-oxidants, anticorrosion agents, flow control agents, thixotropic agents, dispersants, adhesion promoters, UV stabilizers and scavenger agents.

13. The aqueous coating composition according to claim 1, comprising between 0.05% and 1.5% by weight of an organometallic compound, based on the weight of nonvolatile material in the coating composition.

14. The aqueous coating composition according to claim 13, wherein the organometallic compound is a titanium complex in the form of a salt.

15. The aqueous coating composition according to claim 1, wherein a crosslinking catalyst is present, the crosslinking catalyst comprising a metal cation and the amount of metal cation based on the weight of non-volatile material in the coating composition is comprised between 0.01 and 0.50% by weight; or wherein 0.0% of crosslinking catalyst is present.

* * * * *